United States Patent
Yamamoto et al.

(10) Patent No.: US 11,374,224 B2
(45) Date of Patent: Jun. 28, 2022

(54) BINDER COMPOSITION FOR NON-AQUEOUS SECONDARY BATTERY, SLURRY COMPOSITION FOR NON-AQUEOUS SECONDARY BATTERY FUNCTIONAL LAYER, FUNCTIONAL LAYER FOR NON-AQUEOUS SECONDARY BATTERY, BATTERY COMPONENT FOR NON-AQUEOUS SECONDARY BATTERY, AND NON-AQUEOUS SECONDARY BATTERY

(71) Applicant: ZEON CORPORATION, Tokyo (JP)

(72) Inventors: Norikazu Yamamoto, Tokyo (JP); Yusaku Matsuo, Tokyo (JP); Hidetake Ishii, Tokyo (JP); Shunjin Aihara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/633,784

(22) PCT Filed: Aug. 23, 2018

(86) PCT No.: PCT/JP2018/031228
§ 371 (c)(1),
(2) Date: Jan. 24, 2020

(87) PCT Pub. No.: WO2019/039560
PCT Pub. Date: Feb. 28, 2019

(65) Prior Publication Data
US 2020/0243861 A1    Jul. 30, 2020

(30) Foreign Application Priority Data
Aug. 24, 2017  (JP) .............................. JP2017-161167

(51) Int. Cl.
*H01M 4/62* (2006.01)
*C08F 297/04* (2006.01)
*H01M 4/13* (2010.01)
*H01M 10/0525* (2010.01)
*H01M 50/411* (2021.01)

(52) U.S. Cl.
CPC .......... *H01M 4/622* (2013.01); *C08F 297/044* (2013.01); *H01M 4/13* (2013.01); *H01M 10/0525* (2013.01); *H01M 50/411* (2021.01)

(58) Field of Classification Search
CPC ...... H01M 4/622; H01M 50/411; H01M 4/13; H01M 10/0525; H01M 50/46; H01M 50/443; H01M 50/449; H01M 4/366; H01M 50/414; H01M 50/417; H01M 4/139; H01M 10/052; H01M 2300/0025; C08F 297/044; C08F 212/08; C08F 297/046; C08L 53/025; C08L 101/14; C08L 53/02; Y02E 60/10
See application file for complete search history.

(56) References Cited

U.S. PATENT DOCUMENTS

| | | | |
|---|---|---|---|
| 2001/0000485 A1 | 4/2001 | Ying et al. | |
| 2011/0245369 A1* | 10/2011 | Lundgard | C08K 3/013 523/122 |
| 2014/0205904 A1* | 7/2014 | Sasaki | C08F 220/18 429/217 |
| 2015/0030933 A1 | 1/2015 | Goetzen et al. | |
| 2016/0126551 A1* | 5/2016 | Sasaki | H01M 4/13 429/217 |
| 2019/0044147 A1* | 2/2019 | Yamamoto | C08L 101/00 |

FOREIGN PATENT DOCUMENTS

| | | |
|---|---|---|
| JP | 2014011019 A | 1/2014 |
| JP | 2015504234 A | 2/2015 |
| WO | 2011024789 A1 | 3/2011 |
| WO | 2014196436 A1 | 12/2014 |
| WO | 2014196547 A1 | 12/2014 |
| WO | 2017056404 A1 | 4/2017 |
| WO | WO-2017056404 A1 * | 4/2017 ............ C08L 53/02 |

OTHER PUBLICATIONS

Feb. 25, 2020, International Preliminary Report on Patentability issued in the International Patent Application No. PCT/JP2018/031228.
Oct. 2, 2018, International Search Report issued in the International Patent Application No. PCT/JP2018/031228.
Feb. 19, 2021, the Extended European Search Report issued by the European Patent Office in the corresponding European Patent Application No. 18847960.4.

* cited by examiner

Primary Examiner — Andrew J. Oyer
(74) Attorney, Agent, or Firm — Kenja IP Law PC

(57) ABSTRACT

Provided is a binder composition for a non-aqueous secondary battery with which it is possible to form a functional layer that can provide a battery component such as an electrode or a separator with a balance of excellent handleability and process adhesiveness. The binder composition for a non-aqueous secondary battery contains: polymer particles containing a block polymer including a block region composed of an aromatic vinyl monomer unit; a water-soluble polymer including a hydrophilic group; and water. The block polymer has a diblock content of not less than 0 mass % and not more than 60 mass %. The water-soluble polymer has a weight-average molecular weight of not less than 15,000 and not more than 500,000.

13 Claims, No Drawings

BINDER COMPOSITION FOR NON-AQUEOUS SECONDARY BATTERY, SLURRY COMPOSITION FOR NON-AQUEOUS SECONDARY BATTERY FUNCTIONAL LAYER, FUNCTIONAL LAYER FOR NON-AQUEOUS SECONDARY BATTERY, BATTERY COMPONENT FOR NON-AQUEOUS SECONDARY BATTERY, AND NON-AQUEOUS SECONDARY BATTERY

TECHNICAL FIELD

The present disclosure relates to a binder composition for a non-aqueous secondary battery, a slurry composition for a non-aqueous secondary battery functional layer, a functional layer for a non-aqueous secondary battery, a battery component for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery normally includes battery components such as electrodes (positive electrode and negative electrode) and a separator that isolates the positive electrode and the negative electrode from one another.

There are cases in which a battery component that includes a functional layer containing a binder and optionally containing particles compounded so as to cause the component to display a desired function (hereinafter, referred to as "functional particles") is used as a battery component of a secondary battery.

Specifically, a separator that includes an adhesive layer containing a binder on a separator substrate or a porous membrane layer containing a binder and non-conductive particles as functional particles on a separator substrate may be used as a separator of a secondary battery. Moreover, an electrode that includes an electrode mixed material layer containing a binder and electrode active material particles as functional particles on a current collector or an electrode that further includes an adhesive layer or a porous membrane layer such as described above on an electrode substrate including an electrode mixed material layer on a current collector may be used as an electrode of a secondary battery.

Attempts have been made to improve binder compositions used in functional layer formation in recent years with the aim of further enhancing secondary battery performance (for example, refer to Patent Literature (PTL) 1 and 2).

PTL 1 proposes a technique for improving close adherence of an electrode mixed material layer to a current collector by forming the electrode mixed material layer using a binder composition that contains a modification polymer including a sulfonic acid (salt) group and a binder resin.

PTL 2 proposes a technique for increasing the strength of an electrode and improving room temperature cycle characteristics of a secondary battery by forming an electrode mixed material layer using a binder composition that contains a polymer obtained through acid modification of a specific hydrogenated block copolymer.

CITATION LIST

Patent Literature

PTL 1: WO 2011/024789 A1
PTL 2: JP 2014-11019 A

SUMMARY

Technical Problem

A battery component that includes a functional layer is required to be easy to handle in a production process of a secondary battery (i.e., a battery component including a functional layer is required to have excellent handleability).

For example, a battery component that includes a porous membrane layer and/or an adhesive layer as a functional layer may be wound up for storage or transport. However, when such a battery component is stored and transported in a wound state, there are cases in which battery components stick together via the porous membrane layer or adhesive layer (i.e., blocking occurs), leading to the occurrence of faults and reduction of productivity. Therefore, it is necessary for a battery component that includes a porous membrane layer and/or an adhesive layer to inhibit blocking during storage and transport.

As another example, an electrode that includes an electrode mixed material layer as a functional layer may be subjected to a pressing process by roll pressing with an objective such as densification of the electrode mixed material layer. However, when the electrode is pressed by roll pressing, the electrode mixed material layer may become stuck to a roll, leading to the occurrence of faults and reduction of productivity. Therefore, it is necessary for an electrode that includes an electrode mixed material layer to inhibit sticking of the electrode mixed material layer to a roll during roll pressing.

On the other hand, in a production process of a secondary battery, battery components may be pressure bonded under high-temperature conditions (for example, 50° C. or higher) to obtain a laminate prior to being immersed in electrolyte solution, and then this laminate may be cut to a desired size as necessary or transported as a laminate. During such cutting or transportation, the pressure bonded battery components may become misaligned, leading to problems such as the occurrence of faults and reduction of productivity. Therefore, with respect to a battery component that includes a functional layer, it is necessary to ensure handleability as previously described while on the other hand providing high adhesiveness between battery components in a production process of a secondary battery (i.e., process adhesiveness).

However, it has been difficult for a battery component including a functional layer to be provided with a balance of high levels of handleability and process adhesiveness even when the functional layer is formed using a conventional binder composition such as previously described.

Accordingly, an objective of the present disclosure is to provide a binder composition for a non-aqueous secondary battery and a slurry composition for a non-aqueous secondary battery functional layer with which it is possible to form a functional layer that can provide a battery component such as an electrode or a separator with a balance of excellent handleability and process adhesiveness.

Another objective of the present disclosure is to provide a functional layer for a non-aqueous secondary battery that can provide a battery component such as an electrode or a separator with a balance of excellent handleability and process adhesiveness.

Yet another objective of the present disclosure is to provide a battery component for a non-aqueous secondary battery having a balance of excellent handleability and process adhesiveness, and a non-aqueous secondary battery that includes this battery component.

Solution to Problem

The inventors conducted diligent investigation with the aim of solving the problems set forth above. The inventors discovered that it is possible to form a functional layer that can cause a battery component to display good handleability and process adhesiveness by using a binder composition that contains: polymer particles containing a block polymer that includes a block region composed of an aromatic vinyl monomer unit and that has a diblock content that is within a specific range; a water-soluble polymer that includes a hydrophilic group and that has a weight-average molecular weight that is within a specific range; and water. In this manner, the inventors completed the present disclosure.

Specifically, the present disclosure aims to advantageously solve the problems set forth above by disclosing a binder composition for a non-aqueous secondary battery comprising: polymer particles containing a block polymer including a block region composed of an aromatic vinyl monomer unit; a water-soluble polymer including a hydrophilic group; and water, wherein the block polymer has a diblock content of not less than 0 mass % and not more than 60 mass %, and the water-soluble polymer has a weight-average molecular weight of not less than 15,000 and not more than 500,000. When a functional layer is formed using a binder composition that contains polymer particles containing a block polymer that includes a block region composed of an aromatic vinyl monomer unit and that has a diblock content that is within the range set forth above, a water-soluble polymer that includes a hydrophilic group and that has a weight-average molecular weight that is within the range set forth, and water in this manner, a battery component that includes the functional layer can be provided with a balance of excellent handleability and excellent process adhesiveness.

A "monomer unit" of a polymer referred to in the present disclosure is a "repeating unit that is derived from a monomer and is included in a polymer obtained using that monomer".

Moreover, when a polymer is said to "include a block region composed of a monomer unit" in the present disclosure, this means that "a portion in which only monomer units of that type are linked as repeating units is present in the polymer".

Furthermore, the term "diblock content" as used in the present disclosure refers to the proportion (mass %) in which diblock structures (macromolecule chains having a diblock structure) are included in the block polymer and can be measured by a method described in the EXAMPLES section of the present specification.

When a polymer is referred to as "water-soluble" in the present disclosure, this means that when 0.5 g of the polymer is dissolved in 100 g of water at a temperature of 25° C., insoluble content is less than 1.0 mass %.

Also, the "weight-average molecular weight" of a water-soluble polymer referred to in the present disclosure can be measured by a method described in the EXAMPLES section of the present specification.

In the presently disclosed binder composition for a non-aqueous secondary battery, the hydrophilic group is preferably a carboxyl group. When a water-soluble polymer including a carboxyl group as a hydrophilic group is used, handleability of a battery component including a functional layer can be further improved. In addition, a slurry composition for a non-aqueous secondary battery functional layer produced using the binder composition can be provided with higher stability and better coating density, and aggregation of components such as the polymer particles during application of the slurry composition can be inhibited.

In the presently disclosed binder composition for a non-aqueous secondary battery, content of the polymer particles is preferably not less than 50 mass % and not more than 99.8 mass % of total content of the polymer particles and the water-soluble polymer. When the proportion constituted by the polymer particles among the total of the polymer particles and the water-soluble polymer is within the range set forth above, process adhesiveness of a battery component including a functional layer can be further improved. In addition, a slurry composition for a non-aqueous secondary battery functional layer produced using the binder composition can be provided with higher stability and better coating density, and aggregation of components such as the polymer particles during application of the slurry composition can be inhibited.

In the presently disclosed binder composition for a non-aqueous secondary battery, the block polymer can include a coupling moiety.

A "coupling moiety" in a polymer referred to in the present disclosure is a "moiety that is derived from a coupling agent and is included in a polymer obtained through a coupling reaction using the coupling agent".

In the presently disclosed binder composition for a non-aqueous secondary battery, the block polymer preferably further includes either or both of an aliphatic conjugated diene monomer unit and an alkylene structural unit. When the block polymer includes an aliphatic conjugated diene monomer unit and/or an alkylene structural unit, process adhesiveness of a battery component including a functional layer can be further improved.

Moreover, in the presently disclosed binder composition for a non-aqueous secondary battery, the water-soluble polymer can include an aliphatic conjugated diene monomer unit.

The present disclosure also aims to advantageously solve the problems set forth above by disclosing a slurry composition for a non-aqueous secondary battery functional layer comprising any one of the binder compositions for a non-aqueous secondary battery set forth above. When a functional layer is formed using a slurry composition that contains any one of the binder compositions set forth above in this manner, a battery component including the functional layer can be provided with a balance of excellent handleability and excellent process adhesiveness.

The presently disclosed slurry composition for a non-aqueous secondary battery functional layer can further comprise electrode active material particles. When the slurry composition for a non-aqueous secondary battery functional layer containing electrode active material particles as functional particles is used to form an electrode mixed material layer, sticking of the electrode mixed material layer to a roll during roll pressing can be inhibited while also enabling production of an electrode having excellent process adhesiveness.

The presently disclosed slurry composition for a non-aqueous secondary battery functional layer can further comprise non-conductive particles. When the slurry composition for a non-aqueous secondary battery functional layer containing non-conductive particles as functional particles is used to form a porous membrane layer, a battery component (separator or electrode) having excellent handleability and process adhesiveness can be produced.

The present disclosure also aims to advantageously solve the problems set forth above by disclosing a functional layer for a non-aqueous secondary battery formed using any one of the slurry compositions for a non-aqueous secondary battery functional layer set forth above. A functional layer that can cause a battery component to display excellent handleability and process adhesiveness can be formed by using any one of the slurry compositions set forth above.

The present disclosure also aims to advantageously solve the problems set forth above by disclosing a battery component for a non-aqueous secondary battery comprising the functional layer for a non-aqueous secondary battery set forth above. A battery component such as a separator or an electrode that includes the functional layer set forth above has excellent handleability and process adhesiveness.

Moreover, when the presently disclosed battery component for a non-aqueous secondary battery set forth above is used to produce a non-aqueous secondary battery, battery component blocking and sticking of an electrode mixed material layer to a roll during roll pressing can be inhibited while on the other hand preventing misalignment of battery components that have been pressure bonded under high-temperature conditions. Consequently, the use of the presently disclosed battery component enables efficient production of a non-aqueous secondary battery having excellent battery characteristics.

Note that in the present specification, a functional layer containing a binder and electrode active material particles is referred to as an "electrode mixed material layer", a functional layer containing a binder and non-conductive particles is referred to as a "porous membrane layer", and a functional layer containing a binder but containing neither electrode active material particles nor non-conductive particles is referred to as an "adhesive layer".

Advantageous Effect

According to the present disclosure, it is possible to provide a binder composition for a non-aqueous secondary battery and a slurry composition for a non-aqueous secondary battery functional layer with which it is possible to form a functional layer that can provide a battery component such as an electrode or a separator with a balance of excellent handleability and process adhesiveness.

Moreover, according to the present disclosure, it is possible to provide a functional layer for a non-aqueous secondary battery that can provide a battery component such as an electrode or a separator with a balance of excellent handleability and process adhesiveness.

Furthermore, according to the present disclosure, it is possible to provide a battery component for a non-aqueous secondary battery having a balance of excellent handleability and process adhesiveness, and a non-aqueous secondary battery that includes this battery component.

DETAILED DESCRIPTION

The following provides a detailed description of embodiments of the present disclosure.

The presently disclosed binder composition for a non-aqueous secondary battery is a binder composition that is used in non-aqueous secondary battery production and can, for example, be used for producing the presently disclosed slurry composition for a non-aqueous secondary battery functional layer. Moreover, the presently disclosed slurry composition for a non-aqueous secondary battery functional layer can be used for forming any functional layer (for example, an electrode mixed material layer, a porous membrane layer, or an adhesive layer) that has a function such as giving and receiving electrons in a non-aqueous secondary battery, reinforcement, or adhesion. Furthermore, the presently disclosed functional layer for a non-aqueous secondary battery is formed from the presently disclosed slurry composition for a non-aqueous secondary battery functional layer. Also, the presently disclosed battery component for a non-aqueous secondary battery is an electrode or a separator, for example, that includes the presently disclosed functional layer for a non-aqueous secondary battery. Moreover, the presently disclosed non-aqueous secondary battery includes the presently disclosed battery component for a non-aqueous secondary battery.

(Binder Composition for Non-Aqueous Secondary Battery)

The presently disclosed binder composition contains polymer particles, a water-soluble polymer, and an aqueous medium, and may optionally further contain other components that can be compounded in functional layers of secondary batteries.

Features of the presently disclosed binder composition are that: the polymer particles contain a block polymer that includes a block region composed of an aromatic vinyl monomer unit and that has a diblock content of not less than 0 mass % and not more than 60 mass %; and the water-soluble polymer includes a hydrophilic group and has a weight-average molecular weight of not less than 15,000 and not more than 500,000.

As a result of the presently disclosed binder composition containing the polymer particles and the water-soluble polymer set forth above in an aqueous medium, a battery component that includes a functional layer can be provided with a balance of excellent handleability and excellent process adhesiveness by forming the functional layer using this binder composition. Although it is not certain why both handleability and process adhesiveness of a battery component can be increased by using the binder composition that contains the polymer particles and the water-soluble polymer in an aqueous medium in this manner, the reason is presumed to be as follows.

Firstly, the block polymer in the polymer particles includes a block region that is composed of an aromatic vinyl monomer unit. The block polymer including this block region composed of an aromatic vinyl monomer unit can display binding capacity under high-temperature conditions but is not excessively tacky at around normal temperature. Moreover, the block polymer has a diblock content of not less than 0 mass % and not more than 60 mass %. Diblock structures in the block polymer have a higher tendency to be tacky than longer chain structures (for example, triblock structures), but since the diblock content of the block polymer used herein is 60 mass % or less as described above, excessive expression of tackiness at around normal temperature due to a large number of diblock structures can be inhibited. When a functional layer is formed using the polymer particles containing the block polymer that displays binding capacity under high-temperature conditions but for which excessive expression of tackiness at around normal temperature is inhibited in this manner, handleability and process adhesiveness of a battery component that includes this functional layer can be ensured.

In addition to the polymer particles set forth above, the presently disclosed binder composition contains a water-soluble polymer that includes a hydrophilic group and that has a weight-average molecular weight of not less than 15,000 and not more than 500,000. In a slurry composition produced using the binder composition that contains the water-soluble polymer set forth above, the water-soluble polymer adheres to the surface of the polymer particles, contributes to improving dispersibility of the polymer particles, and increases the stability of the slurry composition. In addition, aggregation of components such as the polymer particles can be inhibited even in a situation in which shear force is imparted on the slurry composition during application onto a substrate, and the polymer particles can sufficiently display the expected performance described above in an obtained functional layer.

Therefore, the binder composition containing the polymer particles and the water-soluble polymer set forth above in an aqueous medium can be used to form a functional layer that can cause a battery component to display both excellent handleability and excellent process adhesiveness.

<Polymer Particles>

The polymer particles are a component that functions as a binder. In a functional layer formed on a substrate using a slurry composition that contains the binder composition, the polymer particles hold components such as functional particles so that they do not become detached from the functional layer and enable adhesion of battery components via the functional layer.

The polymer particles are water-insoluble particles that are formed from a specific block polymer. The polymer particles contain at least the specific block polymer and may contain components other than the specific block polymer such as components that become unavoidably contained therein at the stage of production.

When particles are referred to as "water-insoluble" in the present disclosure, this means that when 0.5 g of the polymer is dissolved in 100 g of water at a temperature of 25° C., insoluble content is 90 mass % or more.

<<Block Polymer>>

The block polymer contained in the polymer particles is a copolymer including a block region composed of an aromatic vinyl monomer unit (hereinafter, also referred to simply as the "aromatic vinyl block region") and a macromolecule chain section where repeating units other than aromatic vinyl monomer units are linked (hereinafter, also referred to simply as the "other region"). The aromatic vinyl block region and the other region are adjacent to one another in the block polymer. The block polymer may include just one aromatic vinyl block region or may include two or more aromatic vinyl block regions. Likewise, the block polymer may include just one other region or may include two or more other regions.

[Aromatic Vinyl Block Region]

The aromatic vinyl block region is a region that includes only an aromatic vinyl monomer unit as a repeating unit as described above.

Although a single aromatic vinyl block region may be composed of just one type of aromatic vinyl monomer unit or may be composed of two or more types of aromatic vinyl monomer units, it is preferable that a single aromatic vinyl block region is composed of just one type of aromatic vinyl monomer unit.

Moreover, a single aromatic vinyl block region may include a coupling moiety (in other words, a coupling moiety may be linked in-between aromatic vinyl monomer units forming the single aromatic vinyl block region).

Furthermore, in a case in which the block polymer includes two or more aromatic vinyl block regions, the types and proportions of aromatic vinyl monomer units forming these aromatic vinyl block regions may be the same or different for each of the aromatic vinyl block regions, and are preferably the same for each of the aromatic vinyl block regions.

Examples of aromatic vinyl monomers that can form an aromatic vinyl monomer unit forming the aromatic vinyl block region of the block polymer include styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one aromatic vinyl monomer is used individually.

The proportion constituted by the aromatic vinyl monomer unit in the block polymer when the amount of all repeating units in the block polymer (monomer units and structural units; inclusive of repeating units of a graft portion in a case in which the block polymer includes a graft portion) is taken to be 100 mass % is preferably 5 mass % or more, more preferably 10 mass % or more, even more preferably 15 mass % or more, and particularly preferably 22.7 mass % or more, and is preferably 50 mass % or less, more preferably 45 mass % or less, and even more preferably 40 mass % or less. When the proportion constituted by the aromatic vinyl monomer unit in the block polymer is 5 mass % or more, expression of tackiness by the block polymer can be sufficiently inhibited, and handleability of a battery component can be further improved. On the other hand, when the proportion constituted by the aromatic vinyl monomer unit in the block polymer is 50 mass % or less, flexibility of the block polymer can be ensured, and process adhesiveness of a battery component can be further improved.

Note that the proportion constituted by the aromatic vinyl monomer unit in the block polymer is normally the same as the proportion constituted by the aromatic vinyl block region in the block polymer.

[Other Region]

The other region is a region including only a repeating unit other than an aromatic vinyl monomer unit (hereinafter, also referred to simply as the "other repeating unit") as previously described.

A single other region may be composed of just one type of other repeating unit or may be composed of two or more types of other repeating units.

Moreover, a single other region may include a coupling moiety (i.e., a coupling moiety may be linked in-between other repeating units forming the single other region).

Furthermore, in a case in which the block polymer includes two or more other regions, the types and proportions of other repeating units forming these other regions may be the same or different for each of these other regions.

Although no specific limitations are placed on the other repeating unit forming the other region of the block polymer, an aliphatic conjugated diene monomer unit and an alkylene structural unit are preferable from a viewpoint of further improving process adhesiveness of a battery component, for example.

—Aliphatic Conjugated Diene Monomer Unit—

Examples of aliphatic conjugated diene monomers that can form an aliphatic conjugated diene monomer unit included in the other region include conjugated diene compounds having a carbon number of 4 or more such as 1,3-butadiene, isoprene, 2,3-dimethyl-1,3-butadiene, and 1,3-pentadiene. One of these aliphatic conjugated diene monomers may be used individually, or two or more of these aliphatic conjugated diene monomers may be used in combination. Of these aliphatic conjugated diene monomers, 1,3-butadiene and isoprene are preferable from a viewpoint of further improving process adhesiveness of a battery component.

The proportion constituted by the aliphatic conjugated diene monomer unit in the block polymer when the amount of all repeating units in the block polymer is taken to be 100 mass % is preferably 50 mass % or more, more preferably 65 mass % or more, and even more preferably 67 mass % or more, and is preferably 98 mass % or less, and more preferably 95 mass % or less. When the proportion constituted by the aliphatic conjugated diene monomer unit in the block polymer is 50 mass % or more, process adhesiveness of a battery component can be further improved. On the other hand, when the proportion constituted by the aliphatic conjugated diene monomer unit in the block polymer is 98 mass % or less, expression of tackiness by the block polymer can be sufficiently inhibited, and handleability of a battery component can be further improved.

—Alkylene Structural Unit—

The alkylene structural unit included in the other region is a repeating unit composed of only an alkylene structure represented by a general formula: $-C_nH_{2n}-$ (n is an integer of 2 or more).

Although the alkylene structural unit may be linear or branched, the alkylene structural unit is preferably linear (i.e., is preferably a linear alkylene structural unit). Moreover, the carbon number of the alkylene structural unit is preferably 4 or more (i.e., n in the preceding general formula is preferably an integer of 4 or more).

No specific limitations are placed on the method by which the alkylene structural unit is introduced into the block polymer. For example, a method in which a polymer is produced from a monomer composition containing an aliphatic conjugated diene monomer and is then hydrogenated to convert an aliphatic conjugated diene monomer unit to an alkylene structural unit and obtain the block polymer is preferable since production of the block polymer by this method is simple.

The aliphatic conjugated diene monomer used in this method may, for example, be any of the conjugated diene compounds having a carbon number of 4 or more that were previously described as aliphatic conjugated diene monomers that can form an aliphatic conjugated diene monomer unit, of which, isoprene is preferable. In other words, the alkylene structural unit is preferably a structural unit obtained through hydrogenation of an aliphatic conjugated diene monomer unit (i.e., is preferably a hydrogenated aliphatic conjugated diene unit), and is more preferably a structural unit obtained through hydrogenation of an isoprene unit (i.e., is more preferably a hydrogenated isoprene unit). Selective hydrogenation of an aliphatic conjugated diene monomer unit can be carried out by a commonly known method such as an oil-layer hydrogenation method or a water-layer hydrogenation method.

The proportion constituted by the alkylene structural unit in the block polymer when the amount of all repeating units in the block polymer is taken to be 100 mass % is preferably 50 mass % or more, more preferably 65 mass % or more, and even more preferably 67 mass % or more, and is preferably 98 mass % or less, and more preferably 95 mass % or less. When the proportion constituted by the alkylene structural unit in the block polymer is 50 mass % or more, process adhesiveness of a battery component can be further improved. On the other hand, when the proportion constituted by the alkylene structural unit in the block polymer is 98 mass % or less, expression of tackiness by the block polymer can be sufficiently inhibited, and handleability of a battery component can be further improved.

In a case in which the block polymer includes both an alkylene structural unit and an aliphatic conjugated diene monomer unit, the total proportion constituted by the alkylene structural unit and the aliphatic conjugated diene monomer unit in the block polymer when the amount of all repeating units in the block polymer is taken to be 100 mass % is preferably 50 mass % or more, and more preferably 65 mass % or more, and is preferably 90 mass % or less, and more preferably 85 mass % or less. When the total proportion constituted by the alkylene structural unit and the aliphatic conjugated diene monomer unit in the block polymer is 50 mass % or more, process adhesiveness of a battery component can be further improved. On the other hand, when the total proportion constituted by the alkylene structural unit and the aliphatic conjugated diene monomer unit in the block polymer is 90 mass % or less, expression of tackiness by the block polymer can be sufficiently inhibited, and handleability of a battery component can be further improved.

—Graft Portion—

The other region of the block polymer may include a graft portion. In other words, the block polymer may have a structure in which a polymer forming a graft portion is bonded to a polymer forming a trunk portion.

Examples of repeating units that may be included in the graft portion of the block polymer include, but are not specifically limited to, an acidic group-containing monomer unit.

Examples of acidic group-containing monomers that can form the acidic group-containing monomer unit include carboxyl group-containing monomers, sulfo group-containing monomers, and phosphate group-containing monomers.

Examples of carboxyl group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxyl group through hydrolysis can also be used as a carboxyl group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

One of the monomers described above that can form a repeating unit included in the graft portion of the block polymer may be used individually, or two or more of these monomers may be used in combination. Of these monomers, acidic group-containing monomers such as described above are preferable, methacrylic acid, itaconic acid, and acrylic acid are more preferable, and methacrylic acid is even more preferable as a monomer forming a repeating unit included in the graft portion of the block polymer.

No specific limitations are placed on the method by which the graft portion is introduced into the block polymer. For example, a block polymer having a structure in which a polymer of a graft portion is bonded to an aliphatic conjugated diene monomer unit in a polymer of a trunk portion can be obtained by producing a polymer including an aromatic vinyl block region and another region that includes an aliphatic conjugated diene monomer unit, and then carrying out graft polymerization of an acidic group-containing monomer such as described above, or the like, by a known method with the produced polymer as a trunk portion.

In a case in which the block polymer includes a graft portion, the proportion constituted by the graft portion in the block polymer when the amount of all repeating units in the block polymer is taken to be 100 mass % is preferably 0.1 mass % or more, more preferably 0.5 mass % or more, and even more preferably 1 mass % or more, and is preferably 20 mass % or less, more preferably 18 mass % or less, and even more preferably 15 mass % or less.

[Diblock Content]

The block polymer contained by the polymer particles is formed by multiple macromolecule chains. The macromolecule chains forming the block polymer may be any type of structure, such as a diblock structure that includes one each of an aromatic vinyl block region and another region (for example, a structure composed of an aromatic vinyl block region and a block region composed of an aliphatic conjugated diene monomer unit (aliphatic conjugated diene block region)) or a triblock structure that is composed of three regions (for example, a structure composed of an aromatic vinyl block region, an aliphatic conjugated diene block region, and an aromatic vinyl block region).

When the mass of the entire block polymer is taken to be 100 mass %, the proportion constituted by diblock structures in the block polymer (i.e., the diblock content) is required to be not less than 0 mass % and not more than 60 mass %, is preferably 2 mass % or more, and more preferably 5 mass % or more, and is preferably 50 mass % or less, and more preferably 40 mass % or less. A diblock content of more than 60 mass % in the block polymer leads to loss of handleability of a battery component. On the other hand, process adhesiveness of a battery component can be further improved when the diblock content of the block polymer is 2 mass % or more.

The diblock content can be reduced by, for example, carrying out a subsequently described coupling reaction during production of the block polymer. Moreover, the diblock content can be adjusted by altering the type or amount of a coupling agent used in production of the block polymer.

[Weight-Average Molecular Weight]

The weight-average molecular weight of the block polymer is preferably 50,000 or more, more preferably 60,000 or more, even more preferably 70,000 or more, and particularly preferably 140,000 or more, and is preferably 1,000,000 or less, more preferably 900,000 or less, and even more preferably 850,000 or less. Polymer strength can be ensured and electrode strength can be improved when the weight-average molecular weight of the block polymer is 50,000 or more, whereas electrode pressing is easier when the weight-average molecular weight of the block polymer is 1,000,000 or less.

The "weight-average molecular weight" of a block polymer referred to in the present disclosure can be measured by a method described in the EXAMPLES section of the present specification.

<<Production Method of Polymer Particles Containing Block Polymer>>

The polymer particles containing the block polymer including the aromatic vinyl block region can be produced, for example, through a step of performing block polymerization of the above-described monomers in an organic solvent to obtain a solution of a block polymer (block polymer solution production step) and a step of adding water to the obtained block polymer solution and performing emulsification to form particles of the block polymer and obtain a water dispersion of polymer particles (emulsification step).

[Block Polymer Solution Production Step]

No specific limitations are placed on the method of block polymerization in the block polymer solution production step. For example, the block polymer solution can be produced by polymerizing a first monomer component, subsequently adding a second monomer component, differing from the first monomer component, to the resultant solution and performing polymerization thereof, and further repeating monomer component addition and polymerization as necessary. The organic solvent used as a reaction solvent is not specifically limited and may be selected as appropriate depending on the types of monomers and so forth.

The block polymer obtained through block polymerization as described above is preferably subjected to a coupling reaction using a coupling agent in advance of the subsequently described emulsification step. By carrying out a coupling reaction, the terminals of diblock structures contained in the block polymer can be bonded through the coupling agent to convert these structures to triblock structures (i.e., the diblock content can be reduced), for example.

Examples of coupling agents that can be used in the coupling reaction include, but are not specifically limited to, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable from a viewpoint that a block copolymer having a diblock content within a specific range can easily be produced. As a result of the coupling reaction using the coupling agent, a coupling moiety derived from the coupling agent is introduced into a constituent macromolecule chain (for example, a triblock structure) of the block copolymer.

The block polymer solution obtained after the block polymerization and the optional coupling reaction set forth above may be subjected to the subsequently described emulsification step as obtained, or may be subjected to the emulsification step after the block polymer is subjected to hydrogenation and/or graft polymerization such as previously described.

[Emulsification Step]

Although no specific limitations are placed on the method of emulsification in the emulsification step, a method in which a preliminary mixture of the block polymer solution obtained in the block polymer solution production step set forth above and an aqueous solution of an emulsifier is subjected to phase-inversion emulsification, for example, is preferable. The phase-inversion emulsification may be carried out, for example, using a known emulsifier and a known emulsifying and dispersing device.

A water dispersion of polymer particles can then be obtained by removing the organic solvent from the emulsion obtained after phase-inversion emulsification by a known method as necessary, for example.

<Water-Soluble Polymer>

The water-soluble polymer is a component that enables good dispersion of components such as the previously described polymer particles in the aqueous medium. The water-soluble polymer is not specifically limited so long as it includes a hydrophilic group and has a weight-average molecular weight of not less than 15,000 and not more than 500,000, but is preferably a synthetic polymer, and more preferably an addition polymer produced by addition polymerization. Also note that the water-soluble polymer may be in the form of a salt (water-soluble polymer salt). In other words, the term "water-soluble polymer" as used in the present disclosure is also inclusive of a salt of the water-soluble polymer.

<<Hydrophilic Group>>

The hydrophilic group included in the water-soluble polymer may, for example, be a carboxyl group, a sulfo group, a phosphate group, or a hydroxyl group. The water-soluble polymer may include one of these types of hydrophilic groups or may include two or more of these types of hydrophilic groups. Of these hydrophilic groups, a carboxyl group and a sulfo group are preferable, and a carboxyl group is more preferable from a viewpoint of increasing stability and improving coating density of a slurry composition while also inhibiting aggregation of the polymer particles or the like during application of the slurry composition and further improving handleability of a battery component.

No specific limitations are placed on the method by which the hydrophilic group is introduced into the water-soluble polymer. Although a method in which a monomer composition containing at least a monomer including the above-described hydrophilic group (hydrophilic group-containing monomer) is subjected to addition polymerization to produce a polymer and thereby obtain a water-soluble polymer including a hydrophilic group-containing monomer unit or a method in which modification (for example, terminal modification) of any polymer is carried out to obtain a water-soluble polymer including the above-described hydrophilic group may be adopted, the former of these methods is preferable.

<<Hydrophilic Group-Containing Monomer Unit>>

The water-soluble polymer preferably includes at least one selected from the group consisting of a carboxyl group-containing monomer unit, a sulfo group-containing monomer unit, a phosphate group-containing monomer unit, and a hydroxyl group-containing monomer unit as a hydrophilic group-containing monomer unit, more preferably includes either or both of a carboxyl group-containing monomer unit and a sulfo group-containing monomer unit as a hydrophilic group-containing monomer unit, and even more preferably includes a carboxyl group-containing monomer unit as a hydrophilic group-containing monomer unit from a viewpoint of increasing stability and improving coating density of a slurry composition while also inhibiting aggregation of the polymer particles or the like during application of the slurry composition and further improving handleability of a battery component. Note that the water-soluble polymer may include just one of these types of hydrophilic group-containing monomer units or may include two or more of these types of hydrophilic group-containing monomer units.

Examples of carboxyl group-containing monomers that can form a carboxyl group-containing monomer unit, sulfo group-containing monomers that can form a sulfo group-containing monomer unit, and phosphate group-containing monomers that can form a phosphate group-containing monomer unit include those given as examples in the "Polymer particles" section.

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^a—COO—(C_qH_{2q}O)_p—H$ (where p represents an integer of 2 to 9, q represents an integer of 2 to 4, and $R^a$ represents a hydrogen atom or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycols such as (meth)allyl-2-hydroxyethyl thioether and (meth)allyl-2-hydroxypropyl thioether; and hydroxyl group-containing amides such as N-hydroxymethyl acrylamide (N-methylolacrylamide), N-hydroxymethyl methacrylamide, N-hydroxyethyl acrylamide, and N-hydroxyethyl methacrylamide.

The proportion constituted by the hydrophilic group-containing monomer unit in the water-soluble polymer when the amount of all repeating units in the water-soluble polymer is taken to be 100 mass % is preferably 10 mass % or more, more preferably 20 mass % or more, even more preferably 30 mass % or more, and particularly preferably 35 mass % or more. When the proportion constituted by the hydrophilic group-containing monomer unit in the water-soluble polymer is 10 mass % or more, a slurry composition can be provided with higher stability and better coating density while also inhibiting aggregation of the polymer particles or the like during application of the slurry composition and further improving handleability of a battery component. The upper limit for the proportion constituted by the hydrophilic group-containing monomer unit in the water-soluble polymer is not specifically limited and may be set as 100 mass % or less, may be set as 70 mass % or less, may be set as 65 mass % or less, or may be set as 60 mass % or less.

<<Other Monomer Units>>

The water-soluble polymer may include monomer units other than the hydrophilic group-containing monomer unit set forth above (i.e., other monomer units). Monomers that are copolymerizable with the hydrophilic group-containing monomer set forth above may be used without any specific limitations as other monomers that can form other monomer units included in the water-soluble polymer. Examples of such other monomers include (meth)acrylic acid ester monomers, fluorine-containing (meth)acrylic acid ester monomers, cross-linkable monomers, and aliphatic conjugated diene monomers.

Examples of (meth)acrylic acid ester monomers, fluorine-containing (meth)acrylic acid ester monomers, and cross-linkable monomers that can be used include those given as examples in JP 2015-70245, for example.

Examples of aliphatic conjugated diene monomers that can be used include those given as examples in the "Polymer particles" section. One of these aliphatic conjugated diene monomers may be used individually, or two or more of these aliphatic conjugated diene monomers may be used in combination. Of these aliphatic conjugated diene monomers, 1,3-butadiene and isoprene are preferable.

In a case in which the water-soluble polymer is produced using an aliphatic conjugated diene monomer, the proportion constituted by an aliphatic conjugated diene monomer unit in the water-soluble polymer when the amount of all repeating units in the water-soluble polymer is taken to be 100 mass % is preferably 30 mass % or more, more preferably 35 mass % or more, and even more preferably 40 mass % or more, and is preferably 90 mass % or less, more preferably 80 mass % or less, even more preferably 70 mass % or less, further preferably 65 mass % or less, and particularly preferably 60 mass % or less.

When the proportion constituted by the aliphatic conjugated diene monomer unit in the water-soluble polymer is 90 mass % or less, a slurry composition can be provided with higher stability and better coating density while also inhibiting aggregation of the polymer particles or the like during application of the slurry composition and further improving handleability of a battery component.

One of such other monomers may be used individually, or two or more of such other monomers may be used in combination.

<<Production Method of Water-Soluble Polymer>>

The water-soluble polymer can be produced, for example, by polymerizing a monomer composition containing the monomers set forth above, in an aqueous solvent such as water. In the polymerization, the fractional content of each monomer in the monomer composition can be set in accordance with the fractional content of each monomer unit in the water-soluble polymer.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction. Furthermore, the polymerization method may be either of random polymerization or block polymerization. In a case in which the water-soluble polymer is a copolymer produced using two or more monomers, it is preferable that the water-soluble polymer is a random copolymer.

Typically used additives such as emulsifiers, dispersants, polymerization initiators, polymerization aids, and molecular weight modifiers may be used in the polymerization. The amounts of these additives may also be the same as typically used. The polymerization conditions can be adjusted as appropriate depending on the polymerization method, the type of polymerization initiator, and so forth.

<<Weight-Average Molecular Weight>>

The weight-average molecular weight of the water-soluble polymer is required to be not less than 15,000 and not more than 500,000, is preferably 20,000 or more, more preferably 25,000 or more, and even more preferably 100,000 or more, and is preferably 400,000 or less, and more preferably 350,000 or less. A weight-average molecular weight of less than 15,000 for the water-soluble polymer may lead to loss of stability (excessive thickening) of a slurry composition and make uniform application thereof onto a substrate difficult. Moreover, even supposing that application is possible, sufficient coating density cannot be ensured. On the other hand, a weight-average molecular weight of more than 500,000 for the water-soluble polymer leads to aggregation of components such as the polymer particles during slurry composition application, lowers coating density, and reduces handleability and process adhesiveness of a battery component.

The weight-average molecular weight of the water-soluble polymer can be adjusted by altering the amount or type of polymerization initiator and molecular weight modifier.

<Content Ratio of Polymer Particles and Water-Soluble Polymer>

No specific limitations are placed on the content ratio (in terms of solid content) of the polymer particles and the water-soluble polymer in the presently disclosed binder composition. The content of the polymer particles in the presently disclosed binder composition, for example, is preferably 50 mass % or more, more preferably 60 mass % or more, and even more preferably 70 mass % or more of the total content of the polymer particles and the water-soluble polymer, and is preferably 99.8 mass % or less, and more preferably 99.6 mass % or less of the total content of the polymer particles and the water-soluble polymer. When the content of the polymer particles constitutes 50 mass % or more of the total content of the polymer particles and the water-soluble polymer, process adhesiveness of a battery component can be further improved. On the other hand, when the content of the polymer particles constitutes 99.8 mass % or less of the total content of the polymer particles and the water-soluble polymer, a slurry composition can be provided with higher stability and better coating density while also inhibiting aggregation of components such as the polymer particles during application of the slurry composition.

<Aqueous Medium>

The aqueous medium contained in the presently disclosed binder composition is not specifically limited so long as it includes water and may, for example, be an aqueous solution or a mixed solution of water and a small amount of an organic solvent.

<Other Components>

The presently disclosed binder composition can contain components other than the components described above (i.e., other components). For example, the binder composition may contain a known particulate binder (styrene butadiene random copolymer, acrylic polymer, etc.) other than the previously described polymer particles. Moreover, the binder composition may contain known additives. Examples of such known additives include antioxidants such as 2,6-di-tert-butyl-p-cresol, defoamers, and dispersants (excluding those corresponding to the previously described water-soluble polymer). One other component may be used individually, or two or more other components may be used in combination in a freely selected ratio.

<Production Method of Binder Composition>

The presently disclosed binder composition can be produced by mixing the polymer particles, the water-soluble polymer, and optionally used other components, in the presence of the aqueous medium, without any specific limitations. Note that in a case in which a dispersion liquid of the polymer particles and/or an aqueous solution of the water-soluble polymer is used in production of the binder composition, liquid content contained in the dispersion liquid and/or aqueous solution may be used as the aqueous medium of the binder composition.

(Slurry Composition for Non-Aqueous Secondary Battery Functional Layer)

The presently disclosed slurry composition is a composition that is used for formation of a functional layer, that contains the binder composition set forth above, and that optionally further contains functional particles. In other words, the presently disclosed slurry composition contains the previously described polymer particles, water-soluble polymer, and aqueous medium, and may optionally further contain functional particles and other components. A battery component that includes a functional layer formed from the presently disclosed slurry composition has excellent handleability and process adhesiveness as a result of the presently disclosed slurry composition containing the binder composition set forth above.

<Binder Composition>

The presently disclosed binder composition set forth above that contains specific polymer particles and a specific water-soluble polymer in an aqueous medium is used as a binder composition.

No specific limitations are placed on the amount of the binder composition in the slurry composition. In a case in which the slurry composition is a slurry composition for an electrode mixed material layer, for example, the amount of the binder composition may be set as an amount such that, in terms of solid content, the amount of the polymer particles is not less than 0.5 parts by mass and not more than 15 parts by mass per 100 parts by mass of electrode active material particles. Moreover, in a case in which the slurry composition is a slurry composition for a porous membrane layer, for example, the amount of the binder composition may be set as an amount such that, in terms of solid content, the amount of the polymer particles is not less than 0.2 parts by mass and not more than 30 parts by mass per 100 parts by mass of non-conductive particles.

<Functional Particles>

Examples of functional particles that can cause a functional layer to display an expected function include electrode active material particles in a case in which the functional layer is an electrode mixed material layer, for example, and non-conductive particles in a case in which the functional layer is a porous membrane layer, for example.

<<Electrode Active Material Particles>>

Particles composed of any known electrode active material that can be used in a secondary battery can be used without any specific limitations as electrode active material particles. Specifically, particles composed of any of the electrode active materials described below can be used without any specific limitations as electrode active material particles that can be used in an electrode mixed material layer of a lithium ion secondary battery, which is one example of a secondary battery.

[Positive Electrode Active Material]

A positive electrode active material compounded in a positive electrode mixed material layer of a positive electrode in a lithium ion secondary battery may, for example, be a transition metal-containing compound such as a transition metal oxide, a transition metal sulfide, or a composite metal oxide of lithium and a transition metal. The transition metal may be Ti, V, Cr, Mn, Fe, Co, Ni, Cu, Mo, or the like.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

One of these positive electrode active materials may be used individually, or two or more of these positive electrode active materials may be used in combination.

[Negative Electrode Active Material]

A negative electrode active material compounded in a negative electrode mixed material layer of a negative electrode in a lithium ion secondary battery may, for example, be a carbon-based negative electrode active material, a metal-based negative electrode active material, or a negative electrode active material containing any combination thereof.

Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

Moreover, "metal-based negative electrode active material" refers to an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Moreover, an oxide such as lithium titanate can be used.

One of these negative electrode active materials may be used individually, or two or more of these negative electrode active materials may be used in combination.

<<Non-Conductive Particles>>

Any known non-conductive particles that can be used in a secondary battery can be used without any specific limitations as non-conductive particles compounded in a porous membrane layer.

Specifically, although both inorganic fine particles and organic fine particles (excluding those corresponding to a binder such as the previously described polymer particles) can be used as the non-conductive particles, inorganic fine particles are normally used. The material of the non-conductive particles is preferably an electrochemically stable material that is present stably in the environment of use of a secondary battery. Examples of materials of the non-conductive particles that are preferable from the viewpoints set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of these types of non-conductive particles may be used individually, or two or more of these types of non-conductive particles may be used in combination.

<Other Components>

Examples of other components that may be contained in the slurry composition include, but are not specifically limited to, the same other components as may be contained in the presently disclosed binder composition. One of such other components may be used individually, or two or more of such other components may be used in combination in a freely selected ratio.

<Production of Slurry Composition>

No specific limitations are placed on the method by which the slurry composition is produced.

In a case in which the slurry composition is a slurry composition for an electrode mixed material layer, for example, the slurry composition can be produced by mixing the binder composition, electrode active material particles, and other components that are used as necessary, in the presence of an aqueous medium.

Moreover, in a case in which the slurry composition is a slurry composition for a porous membrane layer, the slurry composition can be produced by mixing the binder composition, non-conductive particles, and other components that are used as necessary, in the presence of an aqueous medium.

Furthermore, in a case in which the slurry composition is a slurry composition for an adhesive layer, the binder composition can be used as the slurry composition as obtained or after dilution with an aqueous medium, or the binder composition can be mixed with other components that are used as necessary, in the presence of an aqueous medium, to produce the slurry composition.

The aqueous medium used in production of the slurry composition includes the aqueous medium that was contained in the binder composition. Although no specific limitations are placed on the method of mixing, the mixing may be performed using a typically used stirrer or disperser.

(Functional Layer for Non-Aqueous Secondary Battery)

The presently disclosed functional layer is a layer having a function such as giving and receiving electrons inside a secondary battery, reinforcement, or adhesion. For example, the presently disclosed functional layer may be an electrode mixed material layer in which electrons are given and received through an electrochemical reaction, a porous membrane layer that improves heat resistance and strength, an adhesive layer that improves adhesiveness, or the like.

Moreover, the presently disclosed functional layer is a layer that is formed from the presently disclosed slurry composition set forth above. For example, the presently disclosed functional layer can be formed by applying the slurry composition set forth above onto the surface of a suitable substrate to form a coating film, and subsequently drying the coating film that is formed. In other words, the presently disclosed functional layer is composed of a dried product of the slurry composition set forth above that normally contains components originating from the previously described polymer particles (mainly the block polymer) and the previously described water-soluble polymer, and optionally contains functional particles and other components. Since components contained in the functional layer are components that were contained in the slurry composition, the preferred ratio of each of the components is the same as the preferred ratio of each of the components in the slurry composition. Although the polymer particles are present in a particulate form in the slurry composition, the polymer particles may be present in a particulate form or in any other form in the functional layer formed using the slurry composition.

As a result of the presently disclosed functional layer being formed from the presently disclosed slurry composition containing the presently disclosed binder composition, the presently disclosed functional layer can cause a battery component that includes the functional layer to display excellent handleability and process adhesiveness.

<Substrate>

No limitations are placed on the substrate onto which the slurry composition is applied. For example, a coating film of the slurry composition may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery component of a secondary battery.

However, it is preferable that a current collector, a separator substrate, or an electrode substrate is used as the substrate from a viewpoint of raising battery component production efficiency since a step of peeling the functional layer can be omitted. Specifically, in production of an electrode mixed material layer, the slurry composition is preferably applied onto a current collector as a substrate. Moreover, in production of a porous membrane layer or an adhesive layer, the slurry composition is preferably applied onto a separator substrate or an electrode substrate.

<<Current Collector>>

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of the aforementioned materials may be used individually, or two or more of the aforementioned materials may be used in combination in a freely selected ratio.

<<Separator Substrate>>

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

<<Electrode Substrate>>

The electrode substrate (positive electrode substrate or negative electrode substrate) is not specifically limited and may, for example, be an electrode substrate including an electrode mixed material layer that is formed on a current collector such as described above and that contains electrode active material particles and a binder.

The electrode active material particles and the binder contained in the electrode mixed material layer of the electrode substrate may be any known example thereof without any specific limitations. Moreover, the presently disclosed functional layer (i.e., an electrode mixed material layer formed from a slurry composition containing electrode active material particles, specific polymer particles, and a specific water-soluble polymer) can be used as the electrode mixed material layer of the electrode substrate.

<Formation Method of Functional Layer>

Examples of methods by which the functional layer may be formed on a substrate such as the current collector, separator substrate, or electrode substrate set forth above include:

(1) a method in which the presently disclosed slurry composition is applied onto the surface of the substrate (surface at electrode mixed material layer-side in the case of an electrode substrate; same applies below) and is then dried;

(2) a method in which the substrate is immersed in the presently disclosed slurry composition and is subsequently dried; and (3) a method in which the presently disclosed slurry composition is applied onto a releasable substrate and is dried to produce a functional layer that is then transferred to the surface of the substrate.

Of these methods, method (1) is particularly preferable since it allows simple control of the thickness of the functional layer. In more detail, method (1) includes a step of applying the slurry composition onto the substrate (application step) and a step of drying the slurry composition that has been applied onto the substrate to form a functional layer (functional layer formation step).

<<Application Step>>

Examples of methods by which the slurry composition can be applied onto the substrate in the application step include, but are not specifically limited to, doctor blading, reverse roll coating, direct roll coating, gravure coating, extrusion coating, and brush coating. The presently disclosed slurry composition can be applied onto a substrate with a high coating density as a result of containing the specific water-soluble polymer set forth above. By increasing the coating density of the slurry composition in this manner, an electrode mixed material layer having increased density, for example, can easily be formed through the subsequently described functional layer formation step.

<<Functional Layer Formation Step>>

The method by which the slurry composition on the substrate is dried in the functional layer formation step is not specifically limited and may be a commonly known method. Examples of drying methods that can be used include drying by warm, hot, or low-humidity air, drying in a vacuum, and drying through irradiation with infrared light, electron beams, or the like.

In a case in which the functional layer is an electrode mixed material layer, the functional layer is preferably subjected to a pressing process by roll pressing or the like after drying. This pressing process enables further densification of the obtained electrode mixed material layer.

(Battery Component for Non-Aqueous Secondary Battery)

The presently disclosed battery component is a separator or an electrode, for example, and normally includes the presently disclosed functional layer set forth above on the previously described separator substrate or electrode substrate. The presently disclosed battery component has excellent handleability and also has excellent process adhesiveness as a result of including the presently disclosed functional layer. Moreover, the use of the presently disclosed battery component enables good production of a secondary battery having excellent battery characteristics.

So long as the presently disclosed functional layer is disposed at the surface of the presently disclosed battery component, the presently disclosed battery component may include elements other than a substrate and the presently disclosed functional layer set forth above. Examples of such elements include, but are not specifically limited to, electrode mixed material layers, porous membrane layers, adhesive layers, and the like that do not correspond to the presently disclosed functional layer.

Moreover, the battery component may include two or more types of the presently disclosed functional layer. For example, an electrode may include an electrode mixed material layer formed from the presently disclosed slurry composition for an electrode mixed material layer on a current collector and may also include, on the electrode mixed material layer, a porous membrane layer and/or an adhesive layer formed from the presently disclosed slurry composition for a porous membrane layer and/or the presently disclosed slurry composition for an adhesive layer. Moreover, a separator, for example, may include a porous membrane layer formed from the presently disclosed slurry composition for a porous membrane layer on a separator substrate and may also include an adhesive layer formed from the presently disclosed slurry composition for an adhesive layer on the porous membrane layer.

(Non-Aqueous Secondary Battery)

The presently disclosed secondary battery includes the presently disclosed battery component set forth above. More specifically, the presently disclosed secondary battery includes a positive electrode, a negative electrode, a separator, and an electrolyte solution, wherein the presently disclosed functional layer is included in at least one battery component among the positive electrode, the negative electrode, and the separator. As a result of the presently disclosed secondary battery being produced using the presently disclosed battery component, the occurrence of faults during a production process can be inhibited, and the secondary battery can display excellent battery characteristics.

<Positive Electrode, Negative Electrode, and Separator>

At least one of the positive electrode, the negative electrode, and the separator used in the presently disclosed secondary battery is the presently disclosed battery component set forth above. Note that a known positive electrode, negative electrode, or separator may be used without any specific limitations for a positive electrode, negative electrode, or separator other than the presently disclosed battery component (i.e., not including the presently disclosed functional layer).

<Electrolyte Solution>

The electrolyte solution is normally an organic electrolyte solution obtained by dissolving a supporting electrolyte in an organic solvent. In a lithium ion secondary battery, for example, the supporting electrolyte is a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of organic solvents that can suitably be used in a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, or the like of the resultant stack as necessary to place the resultant stack in a battery container, injecting the electrolyte solution into the battery container, and sealing the battery container. Note that at least one battery component among the positive electrode, the negative electrode, and the separator is the presently disclosed battery component including the presently disclosed functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of two or more monomers, the proportion constituted in the polymer by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used to evaluate the weight-average molecular weight and diblock content of a block polymer, the percentage hydrogenation of a block polymer (hydrogenated product), the weight-average molecular weight of a water-soluble polymer, the coating density of a slurry composition for a negative electrode mixed material layer, the handleability of a battery component (negative electrode roll peeling test and separator blocking test), and the process adhesiveness of a battery component.

<Weight-Average Molecular Weight and Diblock Content of Block Polymer>

First, the weight-average molecular weight of a block polymer was measured as a polystyrene-equivalent molecular weight by high-performance liquid chromatography (apparatus: HLC-8220 (model no.) produced by Tosoh Corporation). This measurement was performed using three linked columns (Shodex KF-404HQ (model no.) produced by Showa Denko K.K.; column temperature: 40° C.; carrier: tetrahydrofuran at flow rate of 0.35 mL/min) and using a differential refractometer and a UV detector as detectors. Molecular weight calibration was performed using 12 points for standard polystyrene (produced by Polymer Laboratories Ltd.; standard molecular weight: 500 to 3,000,000).

Peaks in a chart obtained by the high-performance liquid chromatography described above were attributed to types of structures (for example, diblock structures and triblock structures), and then the diblock content (mass %) was calculated based on the area ratio of these peaks.

<Percentage Hydrogenation of Block Polymer (Hydrogenated Product)>

The percentage hydrogenation of a block polymer (hydrogenated product) was calculated by measuring a $^1$H-NMR spectrum both before and after a hydrogenation reaction, and then calculating the percentage hydrogenation based on the amount of decrease of integrated values for signals corresponding to unsaturated bonds of main chains and side chain portions and unsaturated bonds of aromatic rings between before and after the hydrogenation reaction.

<Weight-Average Molecular Weight of Water-Soluble Polymer>

An obtained aqueous solution of a water-soluble polymer was diluted to 0.05 mass % with the following eluent to obtain a measurement sample. The obtained measurement sample was analyzed by gel permeation chromatography (GPC) under the following conditions to determine the weight-average molecular weight of the water-soluble polymer.

GPC apparatus: HLC-8220 produced by Tosoh Corporation

Separation column: Shodex OHpak SB-807HQ, SB-806M HQ produced by Showa Denko K.K. (temperature: 40° C.)

Eluent: 0.1 mol/L Sodium nitrate (NaNO$_3$) aqueous solution

Flow rate: 0.5 mL/min

Standard material: Standard polyethylene oxide

<Coating Density>

The thickness (cm) and coating weight (g/cm$^2$) of a negative electrode mixed material layer in an obtained negative electrode web were used to calculate coating density (g/cm$^3$) by the following formula. Note that the thickness of the negative electrode mixed material layer was measured using a micrometer.

Coating density (g/cm$^3$)=Coating weight (g/cm$^2$)/ Thickness (cm)

<Handleability>

<<Negative Electrode Roll Peeling Test>>

An obtained negative electrode web was continuously pressed at a pressing rate of 15 m/s using a roll press of 500 mm in diameter to attain a post-pressing negative electrode mixed material layer density of 1.75 g/cm$^3$. During this continuous pressing, the presence of adhered matter originating from negative electrode mixed material layer stuck to the roll surface of the roll press was inspected by eye and was evaluated by the following standard.

A lower tendency for adhered matter to become stuck to the roll surface indicates that the negative electrode has better handleability.

AA: Adhered matter not observed on roll surface even after 1,000 m of continuous pressing A: Adhered matter not observed on roll surface even after 800 m of continuous pressing but adhered matter observed on roll surface at stage at which more than 800 m and less than 1,000 m of continuous pressing is performed B: Adhered matter observed on roll surface at stage at which not less than 500 m and less than 800 m of continuous pressing is performed C: Adhered matter observed on roll surface at stage at which more than 0 m and less than 500 m of continuous pressing is performed <<Separator Blocking Test>>

A porous membrane layer-equipped separator was cut into square pieces of 5 cm×5 cm. Two of these square pieces were overlapped such that porous membrane layer surfaces thereof faced one another. The overlapped square pieces were placed under pressure of 10 g/cm$^2$ at 40° C. to obtain a pressed specimen. The pressed specimen that was obtained was then left for 24 hours. The specimen that had been left for 24 hours was then inspected to check whether the two square pieces were adhered. In the case of a specimen for which adhesion was confirmed, the whole of one of the overlapped separator square pieces was fixed in place and the other square piece was pulled with a force of 0.3 N/m while checking whether peeling thereof was possible. The state of blocking was evaluated by the following standard. When less adhesion is observed, this indicates that the porous membrane layer-equipped separator has better handleability.

A: Square pieces are not adhered to one another

B: Square pieces are adhered to one another but are peelable

C: Square pieces are adhered to one another and are not peelable

Process Adhesiveness

Examples 1 to 10, 16 to 26, and 36, and Comparative Examples 1 to 3

The process adhesiveness of a negative electrode and a separator via a negative electrode mixed material layer (functional layer) was evaluated by measuring the peel strength as described below.

First, the negative electrode and the separator were each cut to 50 mm in length and 10 mm in width. The cut negative electrode and separator were stacked via the negative electrode mixed material layer. The obtained laminate was pressed by a flat plate press with a temperature of 70° C. and a load of 5 kN/m to obtain a specimen.

The specimen was placed with the surface at the current collector-side of the negative electrode facing downward, and cellophane tape (tape prescribed by JIS Z1522) was affixed to the surface of the negative electrode. Note that the cellophane tape was secured to a horizontal test stage in advance. The stress at the time when the separator was peeled by pulling one end vertically upward at a pulling speed of 50 mm/min was then measured. This measurement was performed three times. The average value of the stress measured three times in total was calculated as the peel strength (N/m) and was evaluated by the following standard as process adhesiveness of the negative electrode and the separator via the negative electrode mixed material layer. A larger peel strength indicates better process adhesiveness.

AA: Peel strength of 3 N/m or more

A: Peel strength of not less than 2 N/m and less than 3 N/m

B: Peel strength of not less than 1 N/m and less than 2 N/m

C: Peel strength of less than 1 N/m

Examples 11 to 15 and 27 to 35, and Comparative Example 4

The process adhesiveness of a porous membrane layer-equipped separator and electrodes (positive electrode and negative electrode) via a porous membrane layer (functional layer) was evaluated by measuring the peel strength as described below.

First, the positive electrode, the negative electrode, and the porous membrane layer-equipped separator were each cut to 50 mm in length and 10 mm in width.

The cut positive electrode and separator were stacked such that the positive electrode mixed material layer of the positive electrode and the porous membrane layer of the separator were in contact. The obtained laminate was pressed by a flat plate press at a temperature of 70° C. and a load of 5 kN/m to obtain a specimen.

The specimen was placed with the surface at the current collector-side of the positive electrode facing downward, and cellophane tape (tape prescribed by JIS Z1522) was affixed to the surface of the positive electrode. Note that the cellophane tape was secured to a horizontal test stage in advance. The stress at the time when the separator was peeled by pulling one end vertically upward at a pulling speed of 50 mm/min was then measured. This measurement was performed three times.

A specimen was also obtained by stacking and pressing the cut negative electrode with a separator in the same way as for the positive electrode. Stress was measured for this specimen in the same way as with the positive electrode. This measurement was performed three times.

The average value of the stress measured six times in total was calculated as the peel strength (N/m) and was evaluated by the following standard as process adhesiveness of the porous membrane layer-equipped separator and the electrodes via the porous membrane layer. A larger peel strength indicates better process adhesiveness.

AA: Peel strength of 13 N/m or more
A: Peel strength of not less than 10 N/m and less than 13 N/m
B: Peel strength of not less than 7 N/m and less than 10 N/m
C: Peel strength of less than 7 N/m Example 1

<Production of Polymer Particles>
<<Production of Cyclohexane Solution of Block Polymer>>
A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. Next, these materials were stirred at 40° C. while 1806.5 mmol of n-butyllithium as a polymerization initiator was added thereto and were then heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene as an aliphatic conjugated diene monomer into the pressure-resistant reactor over 1 hour. The polymerization reaction was continued for 1 hour after completing addition of the isoprene. The polymerization conversion rate of isoprene was 100%. Next, 740.6 mmol of dichlorodimethylsilane as a coupling agent was added into the pressure-resistant reactor and a coupling reaction was performed for 2 hours. Thereafter, 3612.9 mmol of methanol was added to the reaction liquid and was thoroughly mixed therewith to deactivate active terminals. Next, 0.3 parts of 2,6-di-tert-butyl-p-cresol as an antioxidant was added to 100 parts of this reaction liquid (containing 30.0 parts of polymer component) and was mixed therewith. The resultant mixed solution was slowly dripped into warm water of 85° C. to 95° C. so as to volatilize solvent and obtain a precipitate. This precipitate was pulverized and then hot-air dried at 85° C. to collect a dried product containing a block polymer.

The dried product that was collected was then dissolved in cyclohexane to produce a block polymer solution having a block polymer concentration of 25%.
<<Phase-Inversion Emulsification>>
A mixture containing sodium alkylbenzene sulfonate, sodium polyoxyethylene alkyl sulfosuccinate, and polyoxyethylene alkyl ether sodium sulfate mixed in a ratio of 1:1:1 (by mass) was dissolved in deionized water to produce a 5% aqueous solution.

A tank was charged with 500 g of the obtained block polymer solution and 500 g of the obtained aqueous solution, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 20,000 rpm to cause phase-inversion emulsification of the preliminary mixture and obtain an emulsion.

Cyclohexane in the obtained emulsion was subsequently evaporated under reduced pressure in a rotary evaporator. The emulsion resulting from this evaporation was left to separate for 1 day in a chromatographic column equipped with a stop-cock, and a lower layer portion was removed after separation to perform concentration.

Finally, an upper layer portion was filtered through a 100-mesh screen to obtain a water dispersion of polymer particles containing a block polymer (block polymer latex).

The obtained water dispersion of the polymer particles containing the block polymer was used to measure the weight-average molecular weight and the diblock content of the block polymer. The results are shown in Table 1.
<Preparation of Water-Soluble Polymer>
An aqueous solution of polymethacrylic acid (produced by Wako Pure Chemical Industries, Ltd.; weight-average molecular weight: 100,000) was prepared.
<Production of Particulate Binder (Styrene Butadiene Random Copolymer)>
A reactor was charged with 150 parts of deionized water, 25 parts of sodium dodecylbenzenesulfonate aqueous solution (concentration: 10%) as an emulsifier, 63 parts of styrene as an aromatic vinyl monomer, 3.5 parts of itaconic acid as a carboxyl group-containing monomer, 1 part of 2-hydroxyethyl acrylate as a hydroxyl group-containing monomer, and 0.5 parts of t-dodecyl mercaptan as a molecular weight modifier in this order. Next, gas inside the reactor was purged three times with nitrogen, and then 32.5 parts of 1,3-butadiene as an aliphatic conjugated diene monomer was added into the reactor. The reactor was maintained at 60° C. while 0.5 parts of potassium persulfate as a polymerization initiator was added to initiate a polymerization reaction, and the polymerization reaction was continued under stirring. At the point at which the polymerization conversion rate reached 96%, cooling was performed and 0.1 parts of hydroquinone aqueous solution (concentration: 10%) as a polymerization inhibitor was added to terminate the polymerization reaction. Residual monomer was subsequently removed using a rotary evaporator with a water temperature of 60° C. to yield a water dispersion of a styrene butadiene random copolymer as a particulate binder.
<Production of Binder Composition for Non-Aqueous Secondary Battery Negative Electrode Mixed Material Layer>
A mixture was obtained by charging a vessel with the water dispersion of the polymer particles, the aqueous solution of the water-soluble polymer, and the water dispersion of the particulate binder obtained as described above such that the mass ratio in terms of solid content was polymer particles:water-soluble polymer:particulate binder=96:4:96. The obtained mixture was stirred for 1 hour using a stirrer (produced by Shinto Scientific Co., Ltd.; product name: Three-One Motor) so as to obtain a binder composition for a negative electrode mixed material layer.

<Production of Slurry Composition for Non-Aqueous Secondary Battery Negative Electrode Mixed Material Layer>

A mixture was obtained by loading 100 parts of artificial graphite (capacity: 360 mAh/g) as a negative electrode active material, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed at 25° C. for 60 minutes. Next, the mixture was adjusted to a solid content concentration of 52% with deionized water and was then mixed at 25° C. for a further 15 minutes to obtain a mixed liquid. Deionized water and 2.2 parts in terms of solid content of the binder composition produced as described above were added to the obtained mixed liquid such that the final solid content concentration was adjusted to 48%. Further mixing was performed for 10 minutes and then a defoaming process was carried out under reduced pressure to obtain a slurry composition for a negative electrode mixed material layer having good fluidity.

<Formation of Negative Electrode>

A comma coater was used to apply the obtained slurry composition for a negative electrode mixed material layer onto copper foil (current collector) of 15 μm in thickness such as to have a thickness of approximately 150 μm after drying. The slurry composition was dried by conveying the copper foil inside a 60° C. oven for 2 minutes at a speed of 0.5 m/min. Thereafter, 2 minutes of heat treatment was performed at 120° C. to obtain a negative electrode web. This negative electrode web was used to evaluate coating density and handleability (negative electrode roll peeling test). The results are shown in Table 1.

The negative electrode web was rolled by roll pressing to obtain a negative electrode having a negative electrode mixed material layer thickness of 80 μm.

<Formation of Positive Electrode>

A slurry composition for a positive electrode mixed material layer was obtained by combining 100 parts of LiCoO₂ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such as to have a total solid content concentration of 70% and mixing these materials using a planetary mixer.

A comma coater was used to apply the obtained slurry composition for a positive electrode mixed material layer onto aluminum foil (current collector) of 20 μm in thickness such as to have a thickness of approximately 150 μm after drying. The slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The positive electrode web was rolled by roll pressing to obtain a positive electrode having a positive electrode mixed material layer thickness of 55 μm.

<Preparation of Separator>

A separator made from a single layer of polypropylene (produced by Celgard, LLC.; product name: Celgard 2500) was used as a separator.

This separator and the negative electrode obtained as described above were used to evaluate process adhesiveness. The results are shown in Table 1.

<Production of Lithium Ion Secondary Battery>

A rectangle of 49 cm×5 cm was cut out from the obtained positive electrode and was placed such that the surface at the positive electrode mixed material layer-side was facing upward. The separator was cut out as 120 cm×5.5 cm and was arranged on the positive electrode mixed material layer such that the positive electrode was positioned at a longitudinal direction left-hand side of the separator. In addition, a rectangle of 50 cm×5.2 cm was cut out from the obtained negative electrode and was arranged on the separator such that the surface at the negative electrode mixed material layer-side faced toward the separator and such that the negative electrode was positioned at a longitudinal direction right-hand side of the separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: LiPF₆ of 1 M in concentration) was injected such that no air remained, and an opening of the aluminum packing case was closed by heat sealing at 150° C. to produce a wound lithium ion secondary battery having a capacity of 800 mAh. Good operation of this lithium ion secondary battery was confirmed.

Example 2

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 1 with the exception that an acrylic polymer produced as described below was used instead of the styrene butadiene random copolymer as a particulate binder in production of the binder composition for a negative electrode mixed material layer. Evaluations were conducted in the same manner as in Example 1. The results are shown in Table 1.

<Production of Particulate Binder (Acrylic Polymer)>

A separable flask equipped with a condenser, a thermometer, a stirrer, and a dropping funnel was charged with 159.5 parts of deionized water and 1.5 parts of a surfactant (produced by Sanyo Chemical Industries, Ltd.; product name: ELEMINOL JS-20 (40% product)), and these materials were heated to 65° C. A monomer emulsion was separately produced by emulsifying 11.0 parts of a surfactant (produced by Sanyo Chemical Industries, Ltd.; product name: ELEMINOL JS-20 (40% product)), 255 parts of styrene as an aromatic vinyl monomer, 225 parts of 2-ethylhexyl acrylate as a (meth)acrylic acid ester monomer, 10 parts of 2-hydroxyethyl acrylate as a hydroxyl group-containing monomer, 10 parts of itaconic acid and 15 parts of acrylic acid as carboxyl group-containing monomers, and 300 parts of deionized water. The obtained monomer emulsion was added dropwise into the separable flask over 3 hours. Concurrently to addition of this monomer emulsion, a solution of 0.4 parts of potassium persulfate as an oxidizing agent dissolved in 55 parts of deionized water and a solution of 0.4 parts of sodium hydroxymethanesulfinate as a reducing agent dissolved in 55 parts of deionized water were added dropwise over 4 hours, and dropwise polymerization was performed at 65° C. Once dropwise addition of the monomer emulsion was completed, aging was performed for 2 hours. The resultant reaction mixture was cooled and 18 parts of ammonia water was added thereto to obtain a water dispersion of an acrylic polymer as a particulate binder.

Example 3

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 1 with the exception that polymer particles produced as described below were used and a particulate binder was not used in production of the binder composition for a negative electrode mixed material layer. Evaluations were conducted in the same manner as in Example 1. The results are shown in Table 1.
<Production of Polymer Particles>
<<Production of Cyclohexane Solution of Block Polymer>>
A dried product containing a block polymer was obtained in the same way as in Example 1. The dried product that was obtained was dissolved in cyclohexane such that the solid content concentration was 10%. Next, 100 g of methacrylic acid as a carboxyl group-containing monomer was added to 10 kg of this dissolved material. The resultant mixture was stirred at 30° C. while 10 g of dimethyl 2,2'-azobis(2-methylpropionate) as a polymerization initiator was added thereto, was heated to 80° C., and was then held at 80° C. for 2 hours to yield a cyclohexane solution of a block polymer in which a graft portion of linked methacrylic acid units had been introduced (block polymer solution).
<<Phase-Inversion Emulsification>>
A water dispersion of polymer particles containing a block polymer (block polymer latex) was obtained in the same way as in Example 1 with the exception that the block polymer solution obtained as described above was used.

Example 4

Polymer particles, a water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 1 with the exception that a particulate binder was not used in production of the binder composition for a negative electrode mixed material layer. Evaluations were conducted in the same manner as in Example 1. The results are shown in Table 1.

Example 5

Polymer particles, a water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that the mass ratio in terms of solid content of the polymer particles and the water-soluble polymer was changed to 98:2 in production of the binder composition for a negative electrode mixed material layer. Evaluations were conducted in the same manner as in Example 1. The results are shown in Table 1.

Example 6

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that polyacrylic acid (produced by Sigma-Aldrich Co. LLC.; weight-average molecular weight: 130,000) was used instead of the aqueous solution of polymethacrylic acid as a water-soluble polymer in production of the binder composition for a negative electrode mixed material layer. Evaluations were conducted in the same manner as in Example 1. The results are shown in Table 1.

Example 7

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that polymer particles produced as described below were used in production of the binder composition for a negative electrode mixed material layer. Evaluations were conducted in the same manner as in Example 1. The results are shown in Table 1.
<Production of Polymer Particles>
<<Production of Cyclohexane Solution of Block Polymer>>
A block polymer solution having a block polymer concentration of 25% was produced in the same way as in Example 1 with the exception that the amount of dichlorodimethylsilane used as a coupling agent was changed to 496.8 mmol.
<<Phase-Inversion Emulsification>>
A water dispersion of polymer particles containing a block polymer (block polymer latex) was obtained in the same way as in Example 1 with the exception that the block polymer solution obtained as described above was used.

Example 8

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that an aqueous solution of poly(sodium styrenesulfonate) (produced by Tosoh Corporation; product name: PolyNaSS PS-5; weight-average molecular weight: 100,000) was used instead of the aqueous solution of polymethacrylic acid as a water-soluble polymer in production of the binder composition for a negative electrode mixed material layer. Evaluations were conducted in the same manner as in Example 1. The results are shown in Table 1.

Example 9

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that an aqueous solution of polyacrylic acid (produced by Sigma-Aldrich Co. LLC.; weight-average molecular weight: 450,000) was used instead of the aqueous solution of polymethacrylic acid as a water-soluble polymer in production of the binder composition for a negative electrode mixed material layer. Evaluations were conducted in the same manner as in Example 1. The results are shown in Table 1.

Example 10

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that polymer particles produced as described below were used in production of the binder composition for a negative electrode mixed material layer. Evaluations were conducted in the same manner as in Example 1. The results are shown in Table 1.
<Production of Polymer Particles>
<<Production of Cyclohexane Solution of Block Polymer>>

A block polymer solution having a block polymer concentration of 25% was produced in the same way as in Example 1 with the exception that 1,3-butadiene was used instead of isoprene as an aliphatic conjugated diene monomer.
<<Phase-Inversion Emulsification>>

A water dispersion of polymer particles containing a block polymer (block polymer latex) was obtained in the same way as in Example 1 with the exception that the block polymer solution obtained as described above was used.

Example 11

<Production of Polymer Particles>
A water dispersion of polymer particles containing a block polymer (block polymer latex) was obtained in the same way as in Example 1.
<Preparation of Water-Soluble Polymer>
The same aqueous solution of polymethacrylic acid (produced by Wako Pure Chemical Industries, Ltd.; weight-average molecular weight: 100,000) as in Example 1 was prepared.
<Production of Binder Composition for Non-Aqueous Secondary Battery Porous Membrane Layer>

A mixture was obtained by charging a vessel with the water dispersion of the polymer particles and the aqueous solution of the water-soluble polymer obtained as described above such that the mass ratio in terms of solid content was polymer particles:water-soluble polymer=20:1. The obtained mixture was stirred for 1 hour using a stirrer (produced by Shinto Scientific Co., Ltd.; product name: Three-One Motor) so as to obtain a binder composition for a porous membrane layer.
<Production of Slurry Composition for Non-Aqueous Secondary Battery Porous Membrane Layer>

A ball mill was used to mix 100 parts in terms of solid content of alumina (produced by Sumitomo Chemical Co., Ltd.; product name: AKP3000) as non-conductive particles and 10 parts in terms of solid content of the binder composition for a porous membrane layer obtained as described above so as to produce a slurry composition for a non-aqueous secondary battery porous membrane layer.
<Formation of Porous Membrane Layer-Equipped Separator>

The slurry composition for a porous membrane layer obtained as described above was applied onto one side of a separator made from a single layer of polypropylene (produced by Celgard, LLC.; product name: Celgard 2500) serving as a separator substrate and was dried at 50° C. for 3 minutes. Thereafter, the slurry composition for a porous membrane layer obtained as described above was also applied onto the other side of the separator and was dried at 50° C. for 3 minutes to obtain a porous membrane layer-equipped separator including a porous membrane layer at both sides (thickness of each porous membrane layer: 2 µm).

The porous membrane layer-equipped separator was used to evaluate handleability (separator blocking test). The result is shown in Table 1.
<Formation of Positive Electrode>

A positive electrode including a positive electrode mixed material layer was obtained in the same way as in Example 1.
<Formation of Negative Electrode>

A negative electrode including a negative electrode mixed material layer was obtained in the same way as in Example 1 with the exception that a binder composition for a negative electrode mixed material layer produced as described below was used.

This negative electrode, the positive electrode obtained as described above, and the porous membrane layer-equipped separator obtained as described above were used to evaluate process adhesiveness. The result is shown in Table 1.
<<Production of Binder Composition for Non-Aqueous Secondary Battery Negative Electrode Mixed Material Layer>>

A reactor was charged with 150 parts of deionized water, 25 parts of sodium dodecylbenzenesulfonate aqueous solution (concentration: 10%) as an emulsifier, 63 parts of styrene as an aromatic vinyl monomer, 3.5 parts of itaconic acid as a carboxyl group-containing monomer, 1 part of 2-hydroxyethyl acrylate as a hydroxyl group-containing monomer, and 0.5 parts of t-dodecyl mercaptan as a molecular weight modifier in this order. Next, gas inside the reactor was purged three times with nitrogen, and then 32.5 parts of 1,3-butadiene as an aliphatic conjugated diene monomer was added. The reactor was maintained at 60° C. while 0.5 parts of potassium persulfate as a polymerization initiator was added to initiate a polymerization reaction, and the polymerization reaction was continued under stirring. At the point at which the polymerization conversion rate reached 96%, cooling was performed and 0.1 parts of hydroquinone aqueous solution (concentration: 10%) as a polymerization inhibitor was added to terminate the polymerization reaction. Residual monomer was subsequently removed using a rotary evaporator having a water temperature of 60° C. to yield a water dispersion of a styrene butadiene random copolymer as a particulate binder. The water dispersion was used as a binder composition for a negative electrode mixed material layer.
<Production of Lithium Ion Secondary Battery>

A rectangle of 49 cm×5 cm was cut out from the obtained positive electrode and was placed such that the surface at the positive electrode mixed material layer-side was facing upward. The porous membrane layer-equipped separator was cut out as 120 cm×5.5 cm and was arranged on the positive electrode mixed material layer such that the positive electrode was positioned at a longitudinal direction left-hand side of the porous membrane layer-equipped separator. In addition, a rectangle of 50 cm×5.2 cm was cut out from the obtained negative electrode and was arranged on the porous membrane layer-equipped separator such that the surface at the negative electrode mixed material layer-side faced toward a porous membrane layer and such that the negative electrode was positioned at a longitudinal direction right-hand side of the porous membrane layer-equipped separator. The resultant laminate was wound by a winding machine to obtain a roll. The roll was enclosed in an aluminum packing case serving as a battery case, electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained, and an opening of the aluminum packing case was closed by heat sealing at 150° C. to produce a wound lithium ion secondary battery having a capacity of 800 mAh. Good operation of the lithium ion secondary battery was confirmed.

Example 12

Polymer particles, a binder composition for a porous membrane layer, a slurry composition for a porous membrane layer, a porous membrane layer-equipped separator, a negative electrode, a positive electrode, and a lithium ion secondary battery were produced in the same way as in Example 11 with the exception that an aqueous solution of a water-soluble polymer (weight-average molecular weight: 300,000) produced as described below was used instead of the aqueous solution of polymethacrylic acid as a water-soluble polymer in production of the binder composition for a porous membrane layer. Evaluations were conducted in the same manner as in Example 11. The results are shown in Table 1.
<Production of Water-Soluble Polymer>
A 5 MPa pressure-resistant vessel equipped with a stirrer was charged with 4 parts of 2-hydroxyethyl acrylate as a hydroxyl group-containing monomer, 32.5 parts of methacrylic acid as a carboxyl group-containing monomer, 0.8 parts of ethylene dimethacrylate as a cross-linkable monomer, 7.5 parts of 2,2,2-trifluoroethyl methacrylate as a fluorine-containing (meth)acrylic acid ester monomer, 55.2 parts of ethyl acrylate as a (meth)acrylic acid ester monomer, 0.1 parts of sodium dodecylbenzenesulfonate as a surfactant, 0.1 parts of t-dodecyl mercaptan as a molecular weight modifier, 150 parts of deionized water, and 0.5 parts of potassium persulfate as a polymerization initiator. These materials were sufficiently stirred and were then heated to 60° C. to initiate polymerization. At the point at which the polymerization conversion rate reached 96%, cooling was performed to terminate the reaction and yield a mixture containing a water-soluble polymer. The mixture containing the water-soluble polymer was adjusted to pH 8 through addition of 10% ammonia water to obtain an aqueous solution of a water-soluble polymer (random copolymer).

Example 13

A water-soluble polymer, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that polymer particles containing a block polymer into which a graft portion of linked methacrylic acid units had been introduced, which were produced in the same way as in Example 3, were used as polymer particles in production of the binder composition for a porous membrane layer. Evaluations were conducted in the same manner as in Example 11. The results are shown in Table 1.

Example 14

A water-soluble polymer, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that polymer particles produced in the same way as in Example 7 were used as polymer particles in production of the binder composition for a porous membrane layer. Evaluations were conducted in the same manner as in Example 11. The results are shown in Table 1.

Example 15

Polymer particles, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that an aqueous solution of poly(sodium styrenesulfonate) (produced by Tosoh Corporation; product name: PolyNaSS PS-5; weight-average molecular weight: 100,000) was used instead of the aqueous solution of polymethacrylic acid as a water-soluble polymer in production of the binder composition for a porous membrane layer. Evaluations were conducted in the same manner as in Example 11. The results are shown in Table 1.

Example 16

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that polymer particles produced as described below were used in production of the binder composition for a negative electrode mixed material layer. Evaluations were conducted in the same manner as in Example 1. The results are shown in Table 1.
<Production of Polymer Particles>
<<Production of Cyclohexane Solution of Block Polymer>>
A pressure-resistant reactor was charged with 233.3 kg of cyclohexane, 54.2 mmol of TMEDA, and 25.0 kg of styrene as an aromatic vinyl monomer. Next, these materials were stirred at 40° C. while 1806.5 mmol of n-butyllithium as a polymerization initiator was added thereto and were then heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene as an aliphatic conjugated diene monomer into the pressure-resistant reactor over 1 hour. The polymerization reaction was continued for 1 hour after completing addition of the isoprene. The polymerization conversion rate of isoprene was 100%. Next, 740.6 mmol of dichlorodimethylsilane as a coupling agent was added into the pressure-resistant reactor and a coupling reaction was performed for 2 hours. Thereafter, 3612.9 mmol of methanol was added to the reaction liquid and was thoroughly mixed therewith to deactivate active terminals. Next, 0.3 parts of 2,6-di-tert-butyl-p-cresol as an antioxidant was added to 100 parts of this reaction liquid (containing 30.0 parts of polymer component) and was mixed therewith. The resultant mixed solution was transferred to a pressure-resistant reactor including a stirring device, and then 4.0 parts of a silica-alumina-supported nickel catalyst (produced by JGC Catalysts and Chemicals Ltd.; product name: E22U; supported amount of nickel: 60%) as a hydrogenation catalyst and 100 parts of dehydrated cyclohexane were added and mixed therewith. The inside of the reactor was purged with hydrogen gas, the solution was stirred while hydrogen was fed into the reactor, and a hydrogen reaction was performed for 6 hours at a temperature of 170° C. and a pressure of 4.5 MPa.

After completion of this hydrogenation reaction, the reaction solution was filtered to remove the hydrogenation catalyst. Next, filtration was performed using a Zeta Plus® (Zeta Plus is a registered trademark in Japan, other countries, or both) filter 30H (produced by CUNO Inc.; pore diameter: 0.5 µm to 1 µm) and a separate metal fiber filter (produced by Nichidai Corporation; pore diameter: 0.4 µm) in this order to remove fine solid content. Next, a cylindrical evaporator (produced by Hitachi, Ltd.; product name: KONTRO) was used to remove cyclohexane (solvent) and other volatile components from the solution at a temperature of 260° C. and a pressure of 0.001 MPa or lower, and the resultant product was extruded in a molten state as strands from a die directly connected to the evaporator. The extruded product was cooled and was subsequently cut by a pelletizer to obtain pellets of a block polymer (hydrogenated product).

The collected pellets were dissolved in cyclohexane to produce a block polymer solution having a block polymer (hydrogenated product) concentration of 25%.

Through measurement of the percentage hydrogenation of the obtained polymer, it was confirmed that the percentage hydrogenation of unsaturated bonds in main chains and side chain portions was 99.9 mol % and the percentage hydrogenation of unsaturated bonds in aromatic rings was 0 mol %.

Comparative Example 1

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that polymer particles produced as described below were used in production of the binder composition for a negative electrode mixed material layer. Evaluations were conducted in the same manner as in Example 1. The results are shown in Table 1.

<Production of Polymer Particles>
<<Production of Cyclohexane Solution of Block Polymer>>

A block polymer solution having a block polymer concentration of 25% was produced in the same way as in Example 1 with the exception that the amount of dichlorodimethylsilane used as a coupling agent was changed to 225.8 mmol.

<<Phase-Inversion Emulsification>>

A water dispersion of polymer particles containing a block polymer (block polymer latex) was obtained in the same way as in Example 1 with the exception that the block polymer solution obtained as described above was used.

Comparative Example 2

Polymer particles, a binder composition for a negative electrode mixed material layer, and a slurry composition for a negative electrode mixed material layer were produced in the same way as in Example 4 with the exception that in production of the binder composition for a negative electrode mixed material layer, an aqueous solution of polyacrylic acid (produced by Wako Pure Chemical Industries, Ltd.; weight-average molecular weight: 5,000) was used instead of the aqueous solution of polymethacrylic acid as a water-soluble polymer and the mass ratio in terms of solid content of the polymer particles and the water-soluble polymer was changed to 98:2. However, it was not possible to produce a negative electrode due to excessive thickening of the slurry composition.

Comparative Example 3

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that in production of the binder composition for a negative electrode mixed material layer, an aqueous solution of polyacrylic acid (produced by Wako Pure Chemical Industries, Ltd.; weight-average molecular weight: 100,000) was used instead of the aqueous solution of polymethacrylic acid as a water-soluble polymer and the mass ratio in terms of solid content of the polymer particles and the water-soluble polymer was changed to 98:2. Evaluations were conducted in the same manner as in Example 1. The results are shown in Table 1.

Comparative Example 4

A water-soluble polymer, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that polymer particles produced in the same way as in Comparative Example 1 were used in production of the binder composition for a porous membrane layer. Evaluations were conducted in the same manner as in Example 11. The results are shown in Table 1.

Example 17

Polymer particles, a particulate binder, a binder composition for a negative electrode mixed material layer, a slurry composition for a negative electrode mixed material layer, a negative electrode, a positive electrode, a separator, and a lithium ion secondary battery were prepared or produced in the same way as in Example 1 with the exception that an aqueous solution of a water-soluble polymer (weight-average molecular weight: 300,000) produced as described below was used instead of the aqueous solution of polymethacrylic acid as a water-soluble polymer in production of the binder composition for a negative electrode mixed material layer. Evaluations were conducted in the same manner as in Example 1. The results are shown in Table 2.

<Production of Water-Soluble Polymer>

A reactor was charged with 473 parts of deionized water, 58 parts of methacrylic acid (carboxyl group-containing monomer), 0.6 parts of t-dodecyl mercaptan, and 3.0 parts of sodium dodecylbenzenesulfonate diluted to a solid content concentration of 10% with deionized water. Next, the inside of the reactor was tightly sealed and was purged twice with nitrogen under stirring by an impeller. After this nitrogen purging, 42 parts of isoprene (aliphatic conjugated diene monomer) that had also undergone nitrogen purging was loaded into the reactor. The inside of the reactor was subsequently controlled to a temperature of 5° C. Once it was confirmed that the inside of the reactor was controlled to 5° C., 0.01 parts of hydrosulfite was dissolved in deionized water and was added into the reactor. After 5 minutes had passed from addition of the hydrosulfite, 0.1 parts of cumene hydroperoxide (first addition) was added. A solution was obtained in a separate vessel by dissolving 0.04 parts of sodium formaldehyde sulfoxylate (produced by Mitsubishi Gas Chemical Company, Ltd.; product name: SFS) (first addition), 0.003 parts of ferrous sulfate (produced by Chubu Chelest Co., Ltd.; product name: Frost Fe) (first addition), and 0.03 parts of ethylenediaminetetraacetic acid (produced by Chubu Chelest Co., Ltd.; product name: Chelest 400G) in 9.0 parts of deionized water, and was then added into the reactor.

Once the polymerization conversion rate reached 40%, the inside of the reactor was heated to 10° C. The inside of the reactor was subsequently heated to 18° C. once the polymerization conversion rate reached 60%. Thereafter, 0.09 parts of cumene hydroperoxide (second addition) was added into the reactor once the polymerization conversion rate reached 70%. A solution was obtained in a separate vessel by dissolving 0.04 parts of sodium formaldehyde sulfoxylate (produced by Mitsubishi Gas Chemical Company, Ltd.; product name: SFS) (second addition), 0.003 parts of ferrous sulfate (produced by Chubu Chelest Co., Ltd.; product name: Frost Fe) (second addition), and 0.03 parts of ethylenediaminetetraacetic acid (produced by Chubu Chelest Co., Ltd.; product name: Chelest 400G) in 9.0 parts of deionized water, and was then added into the reactor.

Once the polymerization conversion rate reached 93%, 0.12 parts of 2,2,6,6-tetramethylpiperidine 1-oxyl diluted with 10.35 parts of deionized water was added into the reactor to terminate the reaction. After the reaction had been terminated, deodorization was performed by an evaporator until residual isoprene was 300 ppm or less. Once this deodorization was complete, the pH was adjusted to 12 with 5% sodium hydroxide aqueous solution under stirring to obtain an aqueous solution of a water-soluble polymer (random copolymer).

Example 18

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 1 with the exception that in production of the binder composition for a negative electrode mixed material layer, an aqueous solution of a water-soluble polymer (weight-average molecular weight: 300,000) produced in the same way as in Example 17 was used instead of the aqueous solution of polymethacrylic acid as a water-soluble polymer and a particulate binder was not used. Evaluations were conducted in the same manner as in Example 1. The results are shown in Table 2.

Example 19

Polymer particles, a particulate binder, a binder composition for a negative electrode mixed material layer, a slurry composition for a negative electrode mixed material layer, a negative electrode, a positive electrode, a separator, and a lithium ion secondary battery were prepared or produced in the same way as in Example 1 with the exception that an aqueous solution of a water-soluble polymer (weight-average molecular weight: 300,000) produced as described below was used instead of the aqueous solution of polymethacrylic acid as a water-soluble polymer in production of the binder composition for a negative electrode mixed material layer. Evaluations were conducted in the same manner as in Example 1. The results are shown in Table 2.

<Production of Water-Soluble Polymer>

A reactor was charged with 473 parts of deionized water, 58 parts of methacrylic acid (carboxyl group-containing monomer), 0.6 parts of t-dodecyl mercaptan, and 3.0 parts of sodium dodecylbenzenesulfonate diluted to a solid content concentration of 10% with deionized water. Next, the inside of the reactor was tightly sealed and was purged twice with nitrogen under stirring by an impeller. After this nitrogen purging, 42 parts of 1,3-butadiene (aliphatic conjugated diene monomer) that had also undergone nitrogen purging was loaded into the reactor. The inside of the reactor was subsequently controlled to a temperature of 5° C. Once it was confirmed that the inside of the reactor was controlled to 5° C., 0.01 parts of hydrosulfite was dissolved in deionized water and was added into the reactor. After 5 minutes had passed from addition of the hydrosulfite, 0.1 parts of cumene hydroperoxide was added. A solution was obtained in a separate vessel by dissolving 0.04 parts of sodium formaldehyde sulfoxylate (produced by Mitsubishi Gas Chemical Company, Ltd.; product name: SFS), 0.003 parts of ferrous sulfate (produced by Chubu Chelest Co., Ltd.; product name: Frost Fe), and 0.03 parts of ethylenediaminetetraacetic acid (produced by Chubu Chelest Co., Ltd.; product name: Chelest 400G) in 9.0 parts of deionized water, and was then added into the reactor.

Once the polymerization conversion rate reached 40%, the inside of the reactor was heated to 10° C. The inside of the reactor was subsequently heated to 18° C. after the polymerization conversion rate reached 60%. Thereafter, 0.09 parts of cumene hydroperoxide was added into the reactor when the polymerization conversion rate reached 70%. A solution was obtained in a separate vessel by dissolving 0.04 parts of sodium formaldehyde sulfoxylate (produced by Mitsubishi Gas Chemical Company, Ltd.; product name: SFS), 0.003 parts of ferrous sulfate (produced by Chubu Chelest Co., Ltd.; product name: Frost Fe), and 0.03 parts of ethylenediaminetetraacetic acid (produced by Chubu Chelest Co., Ltd.; product name: Chelest 400G) in 9.0 parts of deionized water, and was then added into the reactor.

After the polymerization conversion rate reached 93%, 0.12 parts of 2,2,6,6-tetramethylpiperidine 1-oxyl diluted with 10.35 parts of deionized water was added into the reactor to terminate the reaction. After the reaction had been terminated, deodorization was performed by an evaporator until residual 1,3-butadiene was 300 ppm or less. Once this deodorization was complete, the pH was adjusted to 12 with 5% sodium hydroxide aqueous solution under stirring to obtain an aqueous solution of a water-soluble polymer (random copolymer).

Example 20

Polymer particles, a particulate binder, a binder composition for a negative electrode mixed material layer, a slurry composition for a negative electrode mixed material layer, a negative electrode, a positive electrode, a separator, and a lithium ion secondary battery were prepared or produced in the same way as in Example 2 with the exception that an aqueous solution of a water-soluble polymer (weight-average molecular weight: 300,000) produced in the same way as in Example 17 was used instead of the aqueous solution of polymethacrylic acid as a water-soluble polymer in production of the binder composition for a negative electrode mixed material layer. Evaluations were conducted in the same manner as in Example 1. The results are shown in Table 2.

Example 21

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 3 with the exception that an aqueous solution of a water-soluble polymer (weight-average molecular weight: 300,000) produced in the same way as in Example 17 was used instead of the aqueous solution of polymethacrylic acid as a water-soluble polymer in production of the binder composition for a negative electrode mixed material layer. Evaluations were conducted in the same manner as in Example 1. The results are shown in Table 2.

Example 22

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 3 with the exception that in production of the binder composition for a negative electrode mixed material layer, an aqueous solution of a water-soluble polymer (weight-average molecular weight: 300,000) produced in the same way as in Example 17 was used instead of the aqueous solution of polymethacrylic acid as a water-soluble polymer and a styrene butadiene random copolymer produced as a particulate binder in the same way as in Example 1 was used. Evaluations were conducted in the same manner as in Example 1. The results are shown in Table 2.

Example 23

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 3 with the exception that in production of the binder composition for a negative electrode mixed material layer, an aqueous solution of a water-soluble polymer (weight-average molecular weight: 300,000) produced in the same way as in Example 17 was used instead of the aqueous solution of polymethacrylic acid as a water-soluble polymer and an acrylic polymer produced in the same way as in Example 2 was used. Evaluations were conducted in the same manner as in Example 1. The results are shown in Table 2.

Example 24

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 3 with the exception that an aqueous solution of a water-soluble polymer (weight-average molecular weight: 300,000) produced in the same way as in Example 19 was used instead of the aqueous solution of polymethacrylic acid as a water-soluble polymer in production of the binder composition for a negative electrode mixed material layer. Evaluations were conducted in the same manner as in Example 1. The results are shown in Table 2.

Example 25

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 3 with the exception that in production of the binder composition for a negative electrode mixed material layer, an aqueous solution of a water-soluble polymer (weight-average molecular weight: 300,000) produced in the same way as in Example 19 was used instead of the aqueous solution of polymethacrylic acid as a water-soluble polymer and a styrene butadiene random copolymer produced as a particulate binder in the same way as in Example 1 was used. Evaluations were conducted in the same manner as in Example 1. The results are shown in Table 2.

Example 26

Polymer particles, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that an aqueous solution of a water-soluble polymer (weight-average molecular weight: 300,000) produced in the same way as in Example 17 was used instead of the aqueous solution of polymethacrylic acid as a water-soluble polymer in production of the binder composition for a porous membrane layer. Evaluations were conducted in the same manner as in Example 11. The results are shown in Table 2.

Example 27

Polymer particles, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that in production of the binder composition for a porous membrane layer, an aqueous solution of a water-soluble polymer (weight-average molecular weight: 300,000) produced in the same way as in Example 17 was used instead of the aqueous solution of polymethacrylic acid as a water-soluble polymer and a styrene butadiene random copolymer produced as a particulate binder in the same way as in Example 1 was used. Evaluations were conducted in the same manner as in Example 11. The results are shown in Table 2.

Example 28

Polymer particles, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that an aqueous solution of a water-soluble polymer (weight-average molecular weight: 300,000) produced in the same way as in Example 19 was used instead of the aqueous solution of polymethacrylic acid as a water-soluble polymer in production of the binder composition for a porous membrane layer. Evaluations were conducted in the same manner as in Example 11. The results are shown in Table 2.

Example 29

Polymer particles, a binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that in production of the binder composition for a porous membrane layer, an aqueous solution of a water-soluble polymer (weight-average molecular weight: 300,000) produced in the same way as in Example 19 was used instead of the aqueous solution of polymethacrylic acid as a water-soluble polymer and a styrene butadiene random copolymer produced as a particulate binder in the same way as in Example 1 was used. Evaluations were conducted in the same manner as in Example 11. The results are shown in Table 2.

Example 30

A binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that in production of the binder composition for a porous membrane layer, polymer particles containing a block polymer in which a graft portion of linked methacrylic acid units had been introduced, which were produced in the same way as in Example 3, were used as polymer particles and an aqueous solution of a water-soluble polymer (weight-average molecular weight: 300,000) produced in the same way as in Example 17 was used instead of the aqueous solution of polymethacrylic acid as a water-soluble polymer. Evaluations were conducted in the same manner as in Example 11. The results are shown in Table 2.

Example 31

A binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that in production of the binder composition for a porous membrane layer, polymer particles containing a block polymer in which a graft portion of linked methacrylic acid units had been introduced, which were produced in the same way as in Example 3, were used as polymer particles, an aqueous solution of a water-soluble polymer (weight-average molecular weight: 300,000) produced in the same way as in Example 17 was used instead of the aqueous solution of polymethacrylic acid as a water-soluble polymer, and a styrene butadiene random copolymer produced as a particulate binder in the same way as in Example 1 was used. Evaluations were conducted in the same manner as in Example 11. The results are shown in Table 2.

Example 32

A binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that in production of the binder composition for a porous membrane layer, polymer particles containing a block polymer in which a graft portion of linked methacrylic acid units had been introduced, which were produced in the same way as in Example 3, were used as polymer particles and an aqueous solution of a water-soluble polymer (weight-average molecular weight: 300,000) produced in the same way as in Example 19 was used instead of the aqueous solution of polymethacrylic acid as a water-soluble polymer. Evaluations were conducted in the same manner as in Example 11. The results are shown in Table 2.

Example 33

A binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that in production of the binder composition for a porous membrane layer, polymer particles containing a block polymer in which a graft portion of linked methacrylic acid units had been introduced, which were produced in the same way as in Example 3, were used as polymer particles, an aqueous solution of a water-soluble polymer (weight-average molecular weight: 300,000) produced in the same way as in Example 19 was used instead of the aqueous solution of polymethacrylic acid as a water-soluble polymer, and a styrene butadiene random copolymer produced as a particulate binder in the same way as in Example 1 was used. Evaluations were conducted in the same manner as in Example 11. The results are shown in Table 2.

Example 34

A binder composition for a porous membrane layer, a slurry composition for a porous membrane layer, a porous membrane layer-equipped separator, a negative electrode, a positive electrode, and a lithium ion secondary battery were prepared or produced in the same way as in Example 11 with the exception that in production of the binder composition for a porous membrane layer, polymer particles containing a block polymer in which a graft portion of linked methacrylic acid units had been introduced, which were produced in the same way as in Example 3, were used as polymer particles, an aqueous solution of a water-soluble polymer (weight-average molecular weight: 300,000) produced in the same way as in Example 17 was used instead of the aqueous solution of polymethacrylic acid as a water-soluble polymer, and an acrylic polymer produced in the same way as in Example 2 was used. Evaluations were conducted in the same manner as in Example 11. The results are shown in Table 2.

Example 35

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 4 with the exception that in production of the binder composition for a negative electrode mixed material layer, polymer particles produced in the same way as in Example 16 were used and an aqueous solution of a water-soluble polymer (weight-average molecular weight: 300,000) produced in the same way as in Example 17 was used instead of the aqueous solution of polymethacrylic acid as a water-soluble polymer. Evaluations were conducted in the same manner as in Example 1. The results are shown in Table 2.

Example 36

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 18 with the exception that polymer particles produced in the same way as in Example 7 were used in production of the binder composition for a negative electrode mixed material layer. Evaluations were conducted in the same manner as in Example 1. The results are shown in Table 3.

Example 37

A water-soluble polymer, a particulate binder, a binder composition for a negative electrode mixed material layer, a slurry composition for a negative electrode mixed material layer, a negative electrode, a positive electrode, a separator, and a lithium ion secondary battery were prepared or produced in the same way as in Example 22 with the exception that polymer particles produced as described below were used in production of the binder composition for a negative electrode mixed material layer. Evaluations were conducted in the same manner as in Example 1. The results are shown in Table 3.
<Production of Polymer Particles>
<<Production of Cyclohexane Solution of Block Polymer>>
A block polymer solution having a block polymer concentration of 25% was produced in the same way as in Example 3 with the exception that the amount of dichlorodimethylsilane used as a coupling agent was changed to 496.8 mmol.
<<Phase-Inversion Emulsification>>
A water dispersion of polymer particles containing a block polymer (block polymer latex) was obtained in the same way as in Example 3 with the exception that the block polymer solution obtained as described above was used.

Example 38

A binder composition for a porous membrane layer, a slurry composition for a porous membrane layer, a porous membrane layer-equipped separator, a negative electrode, a positive electrode, and a lithium ion secondary battery were prepared or produced in the same way as in Example 30 with the exception that polymer particles produced in the same way as in Example 37 were used in production of the binder composition for a porous membrane layer. Evaluations were conducted in the same manner as in Example 11. The results are shown in Table 3.

Example 39

A water-soluble polymer, a binder composition for a negative electrode mixed material layer, a slurry composition for a negative electrode mixed material layer, a negative electrode, a positive electrode, a separator, and a lithium ion secondary battery were prepared or produced in the same way as in Example 21 with the exception that a water-soluble polymer (weight-average molecular weight: 450,000) produced as described below was used in production of the binder composition for a negative electrode mixed material layer. Evaluations were conducted in the same manner as in Example 1. The results are shown in Table 3.
<Production of Water-Soluble Polymer>
An aqueous solution of a water-soluble polymer (random copolymer) was obtained in the same way as in Example 17 with the exception that the additive amount of cumene hydroperoxide was changed to 0.08 parts (both first addition and second addition).

Example 40

Polymer particles, a particulate binder, a binder composition for a porous membrane layer, a slurry composition for a porous membrane layer, a porous membrane layer-equipped separator, a negative electrode, a positive electrode, and a lithium ion secondary battery were prepared or produced in the same way as in Example 31 with the exception that a water-soluble polymer (weight-average molecular weight: 100,000) produced as described below was used in production of the binder composition for a porous membrane layer. Evaluations were conducted in the same manner as in Example 11. The results are shown in Table 3.
<Production of Water-Soluble Polymer>
An aqueous solution of a water-soluble polymer (random copolymer) was obtained in the same way as in Example 17 with the exception that the additive amount of cumene hydroperoxide was changed to 0.3 parts (both first addition and second addition), the additive amount of sodium formaldehyde sulfoxylate was changed to 0.12 parts (both first addition and second addition), and the additive amount of ferrous sulfate was changed to 0.009 parts (both first addition and second addition).

Example 41

Polymer particles, a binder composition for a negative electrode mixed material layer, a slurry composition for a negative electrode mixed material layer, a negative electrode, a positive electrode, a separator, and a lithium ion secondary battery were prepared or produced in the same way as in Example 21 with the exception that an aqueous solution of a water-soluble polymer (weight-average molecular weight: 300,000) produced in the same way as in Example 12 was used instead of the aqueous solution of a water-soluble polymer (weight-average molecular weight: 300,000) produced in the same way as in Example 17 in production of the binder composition for a negative electrode mixed material layer. Evaluations were conducted in the same manner as in Example 1. The results are shown in Table 3.

In Tables 1 to 3, shown below:
"AG" indicates artificial graphite;
"ST" indicates styrene unit;
"IP" indicates isoprene unit;
"Hydrogenated IP" indicates hydrogenated isoprene unit;
"BD" indicates 1,3-butadiene unit;
"MAA" indicates methacrylic acid unit;
"DDS" indicates moiety derived from dichlorodimethylsilane;
"PMAA" indicates polymethacrylic acid;
"PAA" indicates polyacrylic acid;
"WP" indicates water-soluble polymer produced in Example 12;
"SPSS" indicates poly(sodium styrenesulfonate);
"COOH" indicates carboxyl group;
"$SO_3H$" indicates sulfo group;
"OH" indicates hydroxyl group;
"SBR" indicates styrene butadiene random copolymer;
"ACL" indicates acrylic polymer;
"IP/MAA" indicates random copolymer of isoprene and methacrylic acid; and
"BD/MAA" indicates random copolymer of 1,3-butadiene and methacrylic acid.

TABLE 1

| | | | | | | Example 1 | Example 2 | Example 3 | Example 4 | Example 5 | Example 6 |
|---|---|---|---|---|---|---|---|---|---|---|---|
| Slurry composition | Battery component | | | | | Negative electrode | Negative electrode | Negative electrode | Negative electrode | Negative electrode | Negative electrode |
| | Functional particles | | | | | AG | AG | AG | AG | AG | AG |
| | Binder composition | Polymer particles | Block polymer | Aromatic vinyl block region | Type | ST | ST | ST | ST | ST | ST |
| | | | | | Fractional content [mass %] | 25 | 25 | 22.7 | 25 | 25 | 25 |
| | | | | Other region | Type | IP | IP | IP | IP | IP | IP |
| | | | | | Fractional content [mass %] | 75 | 75 | 68.2 | 75 | 75 | 75 |
| | | | | Other region (graft portion) | Type | — | — | MAA | — | — | — |
| | | | | | Fractional content [mass %] | — | — | 9.1 | — | — | — |
| | | | | Diblock content [mass %] | | 15 | 15 | 15 | 15 | 15 | 15 |
| | | | | Coupling moiety | | DDS | DDS | DDS | DDS | DDS | DDS |
| | | | | Weight-average molecular weight [×$10^4$] | | 15 | 15 | 14 | 15 | 15 | 15 |
| | | Water-soluble polymer | | Type | | PMAA | PMAA | PMAA | PMAA | PMAA | PAA |
| | | | | Hydrophilic group | | COOH | COOH | COOH | COOH | COOH | COOH |
| | | | | Weight-average molecular weight [×$10^4$] | | 10 | 10 | 10 | 10 | 10 | 13 |
| | | Polymer particles/(Polymer particles + Water-soluble polymer) [mass %] | | | | 96 | 96 | 96 | 96 | 98 | 96 |
| | | Particulate binder | | Type | | SBR | ACL | — | — | — | — |
| | | Polymer particles:Particulate binder [mass ratio] | | | | 1:1 | 1:1 | — | — | — | — |
| Process adhesiveness | | | | | | A | A | A | A | A | A |
| Handleability | | | Negative electrode roll peeling test | | | A | A | A | A | A | A |
| | | | Separator blocking test | | | — | — | — | — | — | — |
| Coating density [g/$cm^3$] | | | | | | 0.98 | 0.96 | 0.98 | 0.97 | 0.97 | 0.96 |

| | | | | | | Example 7 | Example 8 | Example 9 | Example 10 | Example 11 | Example 12 |
|---|---|---|---|---|---|---|---|---|---|---|---|
| Slurry composition | Battery component | | | | | Negative electrode | Negative electrode | Negative electrode | Negative electrode | Separator | Separator |
| | Functional particles | | | | | AG | AG | AG | AG | Alumina | Alumina |
| | Binder composition | Polymer particles | Block polymer | Aromatic vinyl block region | Type | ST | ST | ST | ST | ST | ST |
| | | | | | Fractional content [mass %] | 25 | 25 | 25 | 25 | 25 | 25 |
| | | | | Other region | Type | IP | IP | IP | BD | IP | IP |
| | | | | | Fractional content [mass %] | 75 | 75 | 75 | 75 | 75 | 75 |
| | | | | Other region (graft portion) | Type | — | — | — | — | — | — |
| | | | | | Fractional content [mass %] | — | — | — | — | — | — |

TABLE 1-continued

| | | | | | | | | | | | | |
|---|---|---|---|---|---|---|---|---|---|---|---|---|
| | | | | Diblock content [mass %] | | 45 | 15 | 15 | 15 | 15 | 15 |
| | | | | Coupling moiety | | DDS | DDS | DDS | DDS | DDS | DDS |
| | | | | Weight-average molecular weight [$\times 10^4$] | | 15 | 15 | 15 | 15 | 15 | 15 |
| | | Water-soluble polymer | Type | | | PMAA | SPSS | PAA | PMAA | PMAA | WP |
| | | | Hydrophilic group | | | COOH | SO$_3$H | COOH | COOH | COOH | COOHOH |
| | | | Weight-average molecular weight [$\times 10^4$] | | | 10 | 10 | 45 | 10 | 10 | 30 |
| | | Polymer particles/(Polymer particles + Water-soluble polymer) [mass %] | | | | 96 | 96 | 96 | 96 | 95 | 95 |
| | | Particulate binder | Type | | | — | — | — | — | — | — |
| | | Polymer particles:Particulate binder [mass ratio] | | | | — | — | — | — | — | — |
| Process adhesiveness | | | | | | A | A | B | A | A | A |
| Handleability | | | Negative electrode roll peeling test | | | B | B | B | A | — | — |
| | | | Separator blocking test | | | — | — | — | — | A | A |
| Coating density [g/cm$^3$] | | | | | | 0.97 | 0.91 | 0.9 | 0.94 | — | — |

| | | | | | | Example 13 | Example 14 | Example 15 | Example 16 | Comparative Example 1 |
|---|---|---|---|---|---|---|---|---|---|---|
| Slurry composition | Battery component | | | | | Separator | Separator | Separator | Negative electrode | Negative electrode |
| | Functional particles | | | | | Alumina | Alumina | Alumina | AG | AG |
| | Binder composition | Polymer particles | Block polymer | Aromatic vinyl block region | Type | ST | ST | ST | ST | ST |
| | | | | | Fractional content [mass %] | 22.7 | 25 | 25 | 25 | 25 |
| | | | | Other region | Type | IP | IP | IP | Hydrogenated IP | IP |
| | | | | | Fractional content [mass %] | 68.2 | 75 | 75 | 75 | 75 |
| | | | | Other region (graft portion) | Type | MAA | — | — | — | — |
| | | | | | Fractional content [mass %] | 9.1 | — | — | — | — |
| | | | | Diblock content [mass %] | | 15 | 45 | 15 | 15 | 75 |
| | | | | Coupling moiety | | DDS | DDS | DDS | DDS | DDS |
| | | | | Weight-average molecular weight [$\times 10^4$] | | 15 | 15 | 15 | 14.5 | 15 |
| | | Water-soluble polymer | Type | | | PMAA | PMAA | SPSS | PMAA | PMAA |
| | | | Hydrophilic group | | | COOH | COOH | SO$_3$H | COOH | COOH |
| | | | Weight-average molecular weight [$\times 10^4$] | | | 10 | 10 | 10 | 10 | 10 |
| | | Polymer particles/(Polymer particles + Water-soluble polymer) [mass %] | | | | 95 | 95 | 95 | 96 | 96 |
| | | Particulate binder | Type | | | — | — | — | — | — |
| | | Polymer particles:Particulate binder [mass ratio] | | | | — | — | — | — | — |
| Process adhesiveness | | | | | | A | A | B | A | B |
| Handleability | | | Negative electrode roll peeling test | | | — | — | — | A | C |
| | | | Separator blocking test | | | A | B | B | — | — |
| Coating density [g/cm$^3$] | | | | | | — | — | — | 0.95 | 0.96 |

| | | | | | | Comparative Example 2 | Comparative Example 3 | Comparative Example 4 |
|---|---|---|---|---|---|---|---|---|
| | Slurry composition | Battery component | | | | Negative electrode | Negative electrode | Separator |
| | | Functional particles | | | | AG | AG | Alumina |
| | | Binder composition | Polymer particles | Block polymer | Aromatic vinyl block region | Type | ST | ST | ST |
| | | | | | | Fractional content [mass %] | 25 | 25 | 25 |
| | | | | | Other region | Type | IP | IP | IP |
| | | | | | | Fractional content [mass %] | 75 | 75 | 75 |

TABLE 1-continued

|  |  |  |  |  |  |  |
|---|---|---|---|---|---|---|
|  |  |  | Other region (graft portion) | Type | — | — | — |
|  |  |  |  | Fractional content [mass %] | — | — | — |
|  |  |  | Diblock content [mass %] |  | 15 | 15 | 75 |
|  |  |  | Coupling moiety |  | DDS | DDS | DDS |
|  |  |  | Weight-average molecular weight [×10$^4$] |  | 15 | 15 | 15 |
|  |  | Water-soluble polymer | Type |  | PAA | PAA | PMAA |
|  |  |  | Hydrophilic group |  | COOH | COOH | COOH |
|  |  |  | Weight-average molecular weight [×10$^4$] |  | 0.5 | 100 | 10 |
|  |  | Polymer particles/(Polymer particles + Water-soluble polymer) [mass %] |  |  | 98 | 98 | 95 |
|  |  | Particulate binder | Type |  | — | — | — |
|  |  | Polymer particles:Particulate binder [mass ratio] |  |  | — | — | — |
| Process adhesiveness |  |  |  |  | — | C | A |
| Handleability |  |  | Negative electrode roll peeling test |  |  | C | — |
|  |  |  | Separator blocking test |  |  | — | C |
| Coating density [g/cm$^3$] |  |  |  |  |  | 0.82 | — |

TABLE 2

|  |  |  |  |  | Example 17 | Example 18 | Example 19 | Example 20 | Example 21 | Example 22 |
|---|---|---|---|---|---|---|---|---|---|---|
| Slurry composition | Battery component |  |  |  | Negative electrode AG | Negative electrode AG | Negative electrode AG | Negative electrode AG | Negative electrode AG | Negative electrode AG |
|  | Functional particles |  |  |  | ST | ST | ST | ST | ST | ST |
|  | Binder composition | Polymer particles | Block polymer | Aromatic vinyl block region | Type | ST | ST | ST | ST | ST | ST |
|  |  |  |  |  | Fractional content [mass %] | 25 | 25 | 25 | 25 | 22.7 | 22.7 |
|  |  |  |  | Other region | Type | IP | IP | IP | IP | IP | IP |
|  |  |  |  |  | Fractional content [mass %] | 75 | 75 | 75 | 75 | 68.2 | 68.2 |
|  |  |  |  | Other region (graft portion) | Type | — | — | — | — | MAA | MAA |
|  |  |  |  |  | Fractional content [mass %] | — | — | — | — | 9.1 | 9.1 |
|  |  |  |  | Diblock content [mass %] |  | 15 | 15 | 15 | 15 | 15 | 15 |
|  |  |  |  | Coupling moiety |  | DDS | DDS | DDS | DDS | DDS | DDS |
|  |  |  |  | Weight-average molecular weight [×10$^4$] |  | 15 | 15 | 15 | 15 | 14 | 14 |
|  |  |  | Water-soluble polymer | Type | IP/MAA | IP/MAA | BD/MAA | IP/MAA | IP/MAA | IP/MAA |
|  |  |  |  | Hydrophilic group | COOH | COOH | COOH | COOH | COOH | COOH |
|  |  |  |  | Weight-average molecular weight [×10$^4$] | 30 | 30 | 30 | 30 | 30 | 30 |
|  |  | Polymer particles/(Polymer particles + Water-soluble polymer) [mass %] |  |  | 96 | 96 | 96 | 96 | 96 | 96 |
|  |  | Particulate binder | Type |  | SBR | — | SBR | ACL | — | SBR |
|  |  | Polymer particles:Particulate binder [mass ratio] |  |  | 1:1 | — | 1:1 | 1:1 | — | 1:1 |
| Process adhesiveness |  |  |  |  | A | A | A | A | AA | AA |
| Handleability |  |  | Negative electrode roll peeling test |  | A | A | A | A | AA | AA |
|  |  |  | Separator blocking test |  | — | — | — | — | — | — |
| Coating density [g/cm$^3$] |  |  |  |  | 0.98 | 0.98 | 0.98 | 0.96 | 0.98 | 0.98 |

TABLE 2-continued

| | | | | | | Example 23 | Example 24 | Example 25 | Example 26 | Example 27 |
|---|---|---|---|---|---|---|---|---|---|---|
| Slurry composition | Battery component | | | | | Negative electrode | Negative electrode | Negative electrode | Separator | Separator |
| | Functional particles | | | | | AG | AG | AG | Alumina | Alumina |
| | Binder composition | Polymer particles | Block polymer | Aromatic vinyl block region | Type | ST | ST | ST | ST | ST |
| | | | | | Fractional content [mass %] | 22.7 | 22.7 | 22.7 | 25 | 25 |
| | | | | Other region | Type | IP | IP | IP | IP | IP |
| | | | | | Fractional content [mass %] | 68.2 | 68.2 | 68.2 | 75 | 75 |
| | | | | Other region (graft portion) | Type | MAA | MAA | MAA | — | — |
| | | | | | Fractional content [mass %] | 9.1 | 9.1 | 9.1 | — | — |
| | | | | Diblock content [mass %] | | 15 | 15 | 15 | 15 | 15 |
| | | | | Coupling moiety | | DDS | DDS | DDS | DDS | DDS |
| | | | | Weight-average molecular weight [×10⁴] | | 14 | 14 | 14 | 15 | 15 |
| | | Water-soluble polymer | Type | | | IP/MAA | BD/MAA | BD/MAA | IP/MAA | IP/MAA |
| | | | Hydrophilic group | | | COOH | COOH | COOH | COOH | COOH |
| | | | Weight-average molecular weight [×10⁴] | | | 30 | 30 | 30 | 30 | 30 |
| | | Polymer particles/(Polymer particles + Water-soluble polymer) [mass %] | | | | 96 | 96 | 96 | 95 | 95 |
| | | Particulate binder | Type | | | ACL | — | SBR | — | SBR |
| | | Polymer particles:Particulate binder [mass ratio] | | | | 1:1 | — | 1:1 | — | 1:1 |
| Process adhesiveness | | | | | | A | AA | AA | A | A |
| Handleability | | | | Negative electrode roll peeling test | | A | AA | AA | — | — |
| | | | | Separator blocking test | | — | — | — | A | A |
| Coating density [g/cm³] | | | | | | 0.98 | 0.98 | 0.98 | — | — |

| | | | | | | Example 28 | Example 29 | Example 30 | Example 31 | Example 32 |
|---|---|---|---|---|---|---|---|---|---|---|
| Slurry composition | Battery component | | | | | Separator | Separator | Separator | Separator | Separator |
| | Functional particles | | | | | Alumina | Alumina | Alumina | Alumina | Alumina |
| | Binder composition | Polymer particles | Block polymer | Aromatic vinyl block region | Type | ST | ST | ST | ST | ST |
| | | | | | Fractional content [mass %] | 25 | 25 | 22.7 | 22.7 | 22.7 |
| | | | | Other region | Type | IP | IP | IP | IP | IP |
| | | | | | Fractional content [mass %] | 75 | 75 | 68.2 | 68.2 | 68.2 |
| | | | | Other region (graft portion) | Type | — | — | MAA | MAA | MAA |
| | | | | | Fractional content [mass %] | — | — | 9.1 | 9.1 | 9.1 |
| | | | | Diblock content [mass %] | | 15 | 15 | 15 | 15 | 15 |
| | | | | Coupling moiety | | DDS | DDS | DDS | DDS | DDS |
| | | | | Weight-average molecular weight [×10⁴] | | 15 | 15 | 14 | 14 | 14 |
| | | Water-soluble polymer | Type | | | BD/MAA | BD/MAA | IP/MAA | IP/MAA | BD/MAA |
| | | | Hydrophilic group | | | COOH | COOH | COOH | COOH | COOH |
| | | | Weight-average molecular weight [×10⁴] | | | 30 | 30 | 30 | 30 | 30 |
| | | Polymer particles/(Polymer particles + Water-soluble polymer) [mass %] | | | | 95 | 95 | 95 | 95 | 95 |
| | | Particulate binder | Type | | | — | SBR | — | SBR | — |
| | | Polymer particles:Particulate binder [mass ratio] | | | | — | 1:1 | — | 1:1 | — |
| Process adhesiveness | | | | | | A | A | AA | AA | AA |
| Handleability | | | | Negative electrode roll peeling test | | — | — | — | — | — |
| | | | | Separator blocking test | | A | A | AA | AA | AA |
| Coating density [g/cm³] | | | | | | — | — | — | — | — |

TABLE 2-continued

|  |  |  |  |  |  | Example 33 | Example 34 | Example 35 |
|---|---|---|---|---|---|---|---|---|
| Slurry composition | Battery component |  |  |  |  | Separator | Separator | Negative electrode |
|  | Functional particles |  |  |  |  | Alumina | Alumina | AG |
|  | Binder composition | Polymer particles | Block polymer | Aromatic vinyl block region | Type | ST | ST | ST |
|  |  |  |  |  | Fractional content [mass %] | 22.7 | 22.7 | 25 |
|  |  |  |  | Other region | Type | IP | IP | Hydrogenated IP |
|  |  |  |  |  | Fractional content [mass %] | 68.2 | 68.2 | 75 |
|  |  |  |  | Other region (graft portion) | Type | MAA | MAA | — |
|  |  |  |  |  | Fractional content [mass %] | 9.1 | 9.1 | — |
|  |  |  |  | Diblock content [mass %] |  | 15 | 15 | 15 |
|  |  |  |  | Coupling moiety |  | DDS | DDS | DDS |
|  |  |  |  | Weight-average molecular weight [$\times 10^4$] |  | 14 | 14 | 14.5 |
|  |  | Water-soluble polymer | Type |  |  | BD/MAA COOH | IP/MAA COOH | IP/MAA COOH |
|  |  |  | Hydrophilic group |  |  |  |  |  |
|  |  |  | Weight-average molecular weight [$\times 10^4$] |  |  | 30 | 30 | 30 |
|  |  | Polymer particles/(Polymer particles + Water-soluble polymer) [mass %] |  |  |  | 95 | 95 | 96 |
|  |  | Particulate binder | Type |  |  | SBR | ACL | — |
|  |  | Polymer particles:Particulate binder [mass ratio] |  |  |  | 1:1 | 1:1 | — |
|  | Process adhesiveness |  |  |  |  | AA | A | A |
|  | Handleability |  |  | Negative electrode roll peeling test |  | — | — | A |
|  |  |  |  | Separator blocking test |  | AA | A | — |
|  | Coating density [g/cm$^3$] |  |  |  |  | — | — | 0.95 |

TABLE 3

|  |  |  |  |  |  | Example 36 | Example 37 | Example 38 |
|---|---|---|---|---|---|---|---|---|
| Slurry composition | Battery component |  |  |  |  | Negative electrode | Negative electrode | Separator |
|  | Functional particles |  |  |  |  | AG | AG | Alumina |
|  | Binder composition | Polymer particles | Block polymer | Aromatic vinyl block region | Type | ST | ST | ST |
|  |  |  |  |  | Fractional content [mass %] | 25 | 22.7 | 22.7 |
|  |  |  |  | Other region | Type | IP | IP | IP |
|  |  |  |  |  | Fractional content [mass %] | 75 | 68.2 | 68.2 |
|  |  |  |  | Other region (graft portion) | Type | — | MAA | MAA |
|  |  |  |  |  | Fractional content [mass %] | — | 9.1 | 9.1 |
|  |  |  |  | Diblock content [mass %] |  | 45 | 45 | 45 |
|  |  |  |  | Coupling moiety |  | DDS | DDS | DDS |
|  |  |  |  | Weight-average molecular weight [$\times 10^4$] |  | 13 | 12 | 12 |
|  |  | Water-soluble polymer | Type |  |  | IP/MAA COOH | IP/MAA COOH | IP/MAA COOH |
|  |  |  | Hydrophilic group |  |  |  |  |  |
|  |  |  | Weight-average molecular weight [$\times 10^4$] |  |  | 30 | 30 | 30 |
|  |  | Polymer particles/(Polymer particles + Water-soluble polymer) [mass %] |  |  |  | 96 | 96 | 95 |
|  |  | Particulate binder | Type |  |  | — | SBR | — |
|  |  | Polymer particles:Particulate binder [mass ratio] |  |  |  | — | 1:1 | — |

TABLE 3-continued

| | | | | | | Example 39 | Example 40 | Example 41 |
|---|---|---|---|---|---|---|---|---|
| Process adhesiveness | | | | | | A | AA | AA |
| Handleability | | | Negative electrode roll peeling test | | | B | A | — |
| | | | Separator blocking test | | | — | — | A |
| Coating density [g/cm³] | | | | | | 0.98 | 0.98 | — |
| Slurry composition | Battery component | | | | | Negative electrode | Separator | Negative electrode |
| | Functional particles | | | | | AG | Alumina | AG |
| | Binder composition | Polymer particles | Block polymer | Aromatic vinyl block region | Type | ST | ST | ST |
| | | | | | Fractional content [mass %] | 22.7 | 22.7 | 22.7 |
| | | | | Other region | Type | IP | IP | IP |
| | | | | | Fractional content [mass %] | 68.2 | 68.2 | 68.2 |
| | | | | Other region (graft portion) | Type | MAA | MAA | MAA |
| | | | | | Fractional content [mass %] | 9.1 | 9.1 | 9.1 |
| | | | | Diblock content [mass %] | | 15 | 15 | 15 |
| | | | | Coupling moiety | | DDS | DDS | DDS |
| | | | | Weight-average molecular weight [×10⁴] | | 14 | 14 | 14 |
| | | Water-soluble polymer | | Type | | IP/MAA | IP/MAA | WP |
| | | | | Hydrophilic group | | COOH | COOH | COOHOH |
| | | | | Weight-average molecular weight [×10⁴] | | 45 | 10 | 30 |
| | | Polymer particles/(Polymer particles + Water-soluble polymer) [mass %] | | | | 96 | 95 | 96 |
| | | Particulate binder | | Type | | — | SBR | — |
| | | Polymer particles:Particulate binder [mass ratio] | | | | — | 1:1 | — |
| Process adhesiveness | | | | | | AA | AA | AA |
| Handleability | | | Negative electrode roll peeling test | | | AA | — | AA |
| | | | Separator blocking test | | | — | AA | — |
| Coating density [g/cm³] | | | | | | 0.98 | — | 0.98 |

It can be seen from Tables 1 to 3 that a battery component (negative electrode or separator) could be provided with excellent handleability and process adhesiveness in Examples 1 to 41 in which a functional layer (negative electrode mixed material layer or porous membrane layer) was formed using a binder composition containing: polymer particles containing a block polymer that included a block region composed of an aromatic vinyl monomer unit and that had a diblock content within a range of 0 mass % to 60 mass %; a water-soluble polymer that included a hydrophilic group and that had a weight-average molecular weight within a range of 15,000 to 500,000; and water. It can also be seen that a slurry composition for a negative electrode mixed material layer could be applied onto a current collector with a high coating density in Examples 1 to 10, 16 to 25, 35 to 37, 39, and 41. On the other hand, it can be seen that negative electrode handleability decreased in Comparative Example 1 in which a negative electrode mixed material layer was formed using a binder composition containing polymer particles that contained a block polymer having a diblock content of more than 60 mass %.

Moreover, as previously described, it was not possible to produce a negative electrode due to thickening of the slurry composition for a negative electrode mixed material layer in Comparative Example 2 in which a binder composition containing a water-soluble polymer having a weight-average molecular weight of less than 15,000 was used.

It can also be seen that in Comparative Example 3 in which a negative electrode mixed material layer was formed using a binder composition containing a water-soluble polymer having a weight-average molecular weight of more than 500,000, polymer particles and the like aggregated during application of the slurry composition for a negative electrode mixed material layer, negative electrode handleability and process adhesiveness decreased, and coating density of the slurry composition for a negative electrode mixed material layer decreased.

Moreover, it can be seen that separator handleability decreased in Comparative Example 4 in which a porous membrane layer was formed using a binder composition containing polymer particles that contained a block polymer having a diblock content of more than 60 mass %.

INDUSTRIAL APPLICABILITY

According to the present disclosure, it is possible to provide a binder composition for a non-aqueous secondary battery and a slurry composition for a non-aqueous secondary battery functional layer with which it is possible to form a functional layer that can provide a battery component such as an electrode or a separator with a balance of excellent handleability and process adhesiveness.

Moreover, according to the present disclosure, it is possible to provide a functional layer for a non-aqueous secondary battery that can provide a battery component such as an electrode or a separator with a balance of excellent handleability and process adhesiveness.

Furthermore, according to the present disclosure, it is possible to provide a battery component for a non-aqueous secondary battery having a balance of excellent handleability and process adhesiveness, and a non-aqueous secondary battery that includes this battery component.

The invention claimed is:

1. A binder composition for a non-aqueous secondary battery comprising: polymer particles containing a block polymer including a block region composed of an aromatic vinyl monomer unit; a water-soluble polymer including a hydrophilic group; and water, wherein
the block polymer has a diblock content of 0 mass % or more and not more than 60 mass %, where the diblock content is a proportion of diblock structures in the block polymer with respect to 100 mass % of the entire block polymer,
the water-soluble polymer is polymethacrylic acid having a weight-average molecular weight of not less than 15,000 and not more than 500,000, and
the block polymer has a structure in which a polymer forming a graft portion is bonded to a polymer forming a trunk portion.

2. The binder composition for a non-aqueous secondary battery according to claim 1, wherein content of the polymer particles is not less than 50 mass % and not more than 99.8 mass % of total content of the polymer particles and the water-soluble polymer.

3. The binder composition for a non-aqueous secondary battery according to claim 1, wherein the block polymer further includes a coupling moiety.

4. The binder composition for a non-aqueous secondary battery according to claim 1, wherein the block polymer further includes either or both of an aliphatic conjugated diene monomer unit and an alkylene structural unit.

5. The binder composition for a non-aqueous secondary battery according to claim 1, wherein the graft portion includes an acidic group-containing monomer unit.

6. The binder composition for a non-aqueous secondary battery according to claim 5, wherein the proportion constituted by the graft portion in the block polymer when the amount of all repeating units in the block polymer is taken to be 100 mass % is 0.1 mass % or more and 20 mass % or less.

7. The binder composition for a non-aqueous secondary battery according to claim 1, wherein a proportion constituted by the graft portion in the block polymer when an amount of all repeating units in the block polymer is taken to be 100 mass % is 0.1 mass % or more and 20 mass % or less.

8. A slurry composition for a non-aqueous secondary battery functional layer comprising the binder composition for a non-aqueous secondary battery according to claim 1.

9. The slurry composition for a non-aqueous secondary battery functional layer according to claim 8, further comprising electrode active material particles.

10. The slurry composition for a non-aqueous secondary battery functional layer according to claim 8, further comprising non-conductive particles.

11. A functional layer for a non-aqueous secondary battery formed using the slurry composition for a non-aqueous secondary battery functional layer according to claim 8.

12. A battery component for a non-aqueous secondary battery comprising the functional layer for a non-aqueous secondary battery according to claim 11.

13. A non-aqueous secondary battery comprising the battery component for a non-aqueous secondary battery according to claim 12.

* * * * *